United States Patent
Lu et al.

(10) Patent No.: US 12,267,872 B2
(45) Date of Patent: Apr. 1, 2025

(54) DATA TRANSMISSION METHOD AND APPARATUS, AND COMPUTER-READABLE STORAGE MEDIUM

(71) Applicant: ZTE Corporation, Shenzhen (CN)

(72) Inventors: Ting Lu, Shenzhen (CN); Bo Dai, Shenzhen (CN); Xiubin Sha, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 512 days.

(21) Appl. No.: 17/632,803

(22) PCT Filed: Aug. 10, 2020

(86) PCT No.: PCT/CN2020/108222
§ 371 (c)(1),
(2) Date: Feb. 4, 2022

(87) PCT Pub. No.: WO2021/023311
PCT Pub. Date: Feb. 11, 2021

(65) Prior Publication Data
US 2022/0400520 A1    Dec. 15, 2022

(30) Foreign Application Priority Data
Aug. 8, 2019 (CN) .......................... 201910731740.5

(51) Int. Cl.
*H04W 74/0833* (2024.01)
(52) U.S. Cl.
CPC .............................. *H04W 74/0833* (2013.01)

(58) Field of Classification Search
CPC . H04W 74/0833; H04W 76/27; H04W 76/11; H04W 74/006; H04W 76/10; H04W 74/004; H04W 74/04; H04W 74/0866
See application file for complete search history.

(56) References Cited

U.S. PATENT DOCUMENTS

| | | |
|---|---|---|
| 2006/0251006 A1 | 11/2006 | Oliver |
| 2009/0201873 A1 | 8/2009 | Korhonen et al. |
| 2012/0099515 A1 | 4/2012 | Chen et al. |
| 2020/0044721 A1 | 2/2020 | Choi et al. |
| 2022/0201744 A1* | 6/2022 | Shrestha ............... H04W 76/27 |

(Continued)

FOREIGN PATENT DOCUMENTS

| | | |
|---|---|---|
| CN | 106304383 A | 1/2017 |
| CN | 109392061 A | 2/2019 |

(Continued)

OTHER PUBLICATIONS

European Search Report for corresponding application EP 2084 9114, Report dated Jul. 14, 2022.

(Continued)

*Primary Examiner* — Austin J Moreau
(74) *Attorney, Agent, or Firm* — CANTOR COLBURN LLP

(57) ABSTRACT

Provided are a data transmission method and apparatus, and a computer-readable storage medium. The method includes: receiving, by a first communication node, first information sent from a second communication node, where the first information includes configuration information of a transmission resource.

19 Claims, 7 Drawing Sheets

(56) References Cited

U.S. PATENT DOCUMENTS

2022/0256606 A1* 8/2022 Pham Van ............ H04L 5/0053
2022/0287101 A1* 9/2022 Shi ...................... H04W 68/005

FOREIGN PATENT DOCUMENTS

| | | | |
|---|---|---|---|
| CN | 110050502 A | 7/2019 | |
| CN | 110536472 A | 12/2019 | |
| EP | 3554123 A1 | 10/2019 | |
| WO | 2018066727 A1 | 4/2018 | |
| WO | 2018127092 A1 | 7/2018 | |
| WO | 2018166331 A1 | 9/2018 | |

OTHER PUBLICATIONS

International Search Report PCT/CN2020/108222 filed Aug. 10, 2020; Report Date Nov. 20, 2020.
3GPP TSG-WG Meeting #105bis, Xi'an China, Apr. 8-12, R2-1903827.
Huawei, HiSilicon, Feature lead summary of support for transmission in preconfigures UL resources, 3GPP TSG RAN WG1 Meeting #96, Athens, Greece, Feb 25-Mar. 1, 2019.

* cited by examiner

Fig. 2

| Receive, by a first communication node, first information sent from a second communication node, where the first information includes configuration information of a transmission resource | S110 |

Fig. 3

Receive, by a first communication node, first information sent from a second communication node, where the first information includes configuration information of a transmission resource — S110

↓

Obtain, by the first communication node, an offset of a transmission resource within a range of the configuration information of the transmission resource — S120

↓

Determine, by the first communication node, an initial position X of the transmission resource, and superimpose the offset of the transmission resource on the initial position X to obtain an actually used transmission resource position — S130

Fig. 4

Send, by a second communication node, first information to a first communication node, where the first information includes configuration information of a transmission resource — S210

DATA TRANSMISSION METHOD AND APPARATUS, AND COMPUTER-READABLE STORAGE MEDIUM

The present application is a National Stage Filing of PCT International Application No. PCT/CN2020/108222 filed on Aug. 10, 2020, which claims the priority of Chinese Patent Application No. 201910731740.5, filed to the China National Intellectual Property Administration on Aug. 8, 2019, which is incorporated in its entirety herein by reference.

TECHNICAL FIELD

The present application relates to wireless communication networks, for example, relates to a data transmission method and apparatus, and a computer-readable storage medium.

BACKGROUND

Continuous development of communication technologies enables the Internet of Things standard to efficiently support mobile originated early data transmission (MO-EDT), but no perfect data transmission solution for mobile terminated early data transmission (MT-EDT) is available currently.

SUMMARY

The present application provides a data transmission method and apparatus, and a computer-readable storage medium, which can optimize a signaling process of MT-EDT, reduce signaling overhead and ensure security and efficiency of data transmission.

Some embodiments of the present application provide a data transmission method, which includes:

receiving, by a first communication node, first information sent from a second communication node, where the first information includes configuration information of a transmission resource.

Some embodiments of the present application provide a data transmission method, which includes:

sending, by a second communication node, first information to a first communication node, where the first information includes configuration information of a transmission resource.

Some embodiments of the present application provide a data transmission method, which includes:

receiving, by a first communication node, a third air interface transmission (message 2) sent from a second communication node, where the third air interface transmission includes at least one of the following features: the third air interface transmission includes downlink data, and the third air interface transmission indicates the first communication node to send large-flow uplink data to the second communication node; and sending, by the first communication node, a fourth air interface transmission (message 3) to the second communication node according to the third air interface transmission, wherein the fourth air interface transmission triggers a radio resource control (RRC) connection between the second communication node and the first communication node.

Some embodiments of the present application provide a data transmission method, which includes:

sending, by a second communication node, a third air interface transmission (message 2) to a first communication node, where the third air interface transmission includes at least one of the following features: the third air interface transmission includes downlink data, and the third air interface transmission indicates the first communication node to send large-flow uplink data to the second communication node; and receiving, by the second communication node, a fourth air interface transmission (message 3) sent from the first communication node, wherein the fourth air interface transmission triggers an RRC connection between the second communication node and the first communication node.

Some embodiments of the present application provide a data transmission apparatus, which includes: a processor, and the processor is configured to implement the method of any one of the above-mentioned embodiments when executing a computer program.

Some embodiments of the present application provide a computer-readable storage medium, which stores a computer program, and the computer program implements the method of any one of the above-mentioned embodiments when being executed by the processor.

The above embodiments and other aspects of the present application and implementations thereof are described in more details in the description of drawings, the detailed description of the embodiments and claims.

BRIEF DESCRIPTION OF THE DRAWINGS

FIG. 2 is a schematic flowchart of a data transmission method provided in an embodiment;

FIG. 3 is a schematic flowchart of another data transmission method provided in an embodiment;

FIG. 4 is a schematic flowchart of another data transmission method provided in an embodiment;

DETAILED DESCRIPTION

The embodiments of the present application will be described below in conjunction with the accompanying drawings.

In Release 15 (Rel-15) of an Internet of Things standard (such as the Narrowband Internet of Things (NB-IoT) and enhanced machine type communication (eMTC)), efficient uplink small data packet transmission has already been supported (such as mobile originated early data transmission (MO-EDT)). That is, a terminal can directly encapsulate uplink small data in an uplink signal of a random access process and send the data to a network, and data transmission is considered successful when collision resolution between the terminal and the network is completed. There is no need to establish a wireless connection between the terminal and the network, and the terminal is constantly in an idle state.

Figure 1:
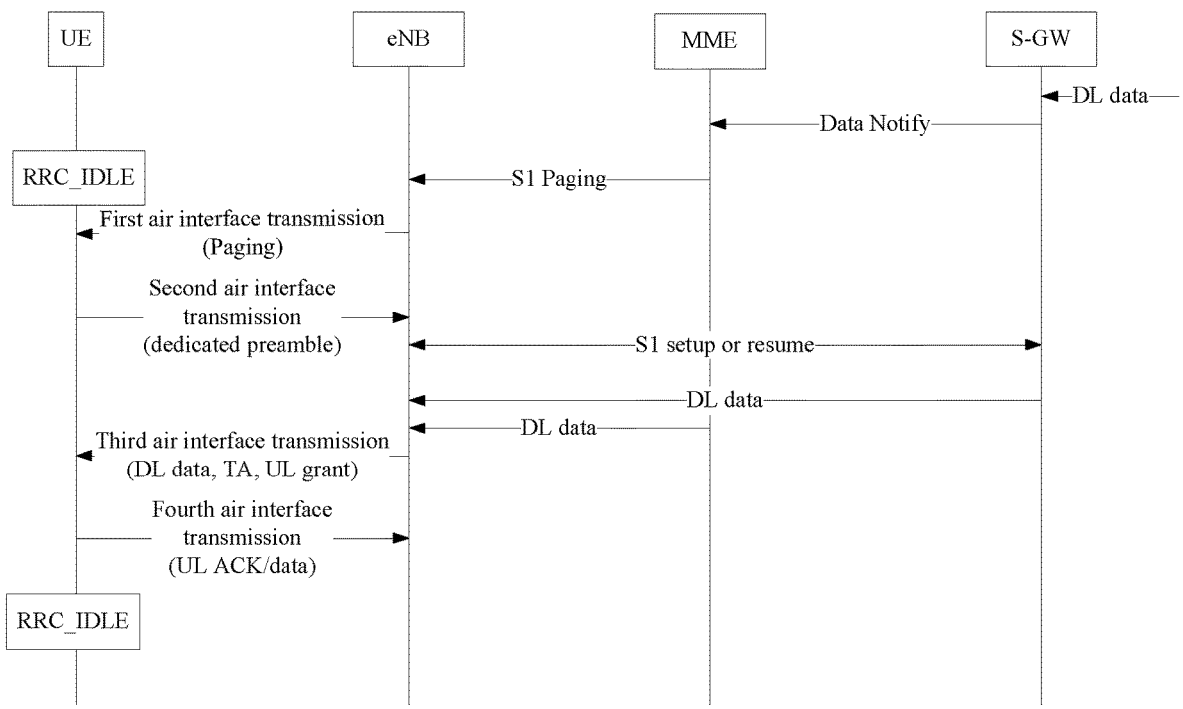
FIG. 1 is a schematic diagram of a basic procedure of MT-EDT provided in an embodiment.

In Rel-16 of the Internet of Things standard, introduction of a new MT-EDT function is being discussed, and the new MT-EDT function is mainly aimed at Internet of Things applications or services that mainly transmit downlink small packets. FIG. 1 shows a schematic diagram of a basic procedure of MT-EDT provided in an embodiment. As shown in FIG. 1, the basic procedure of MT-EDT mainly includes the following operations 1 to 4.

At operation 1, (when a terminal is in an RRC_IDLE state (the terminal may enter the RRC_IDLE state after an inactivity timer expires)) a base station (such as an evolutional NodeB (eNB) as shown in FIG. 1) determines that an MT-EDT procedure needs to be triggered after receiving system information paging (an SI paging message) sent from core network equipment (such as an mobility management entity (MME) as shown in FIG. 1, specifically, the SI paging message is triggered on the basis of a data notification sent from a serving gateway (S-GW) by MME). The base station sends a first air interface transmission (that is, an SI paging message) to a terminal (e.g., UE as shown in FIG. 1) via an air interface, and the SI paging message carries a terminal-specific (i.e., non-contention-based) random access resource and related information of a terminal-specific radio network temporary identifier (RNTI) for identifying uplink and downlink transmission of the terminal.

At operation 2, the terminal obtains a non-contention-based random access resource according to the related information of the non-contention-based random access resource, and sends a second air interface transmission to the base station, that is, the non-contention-based random access resource is used to send a random access preamble, thus minimizing a collision between terminals.

At operation 3, after receiving the random access preamble sent from the terminal on the non-contention-based random access resource, the base station triggers a related procedure to ask a core network for downlink data (DL data) of the terminal, and then the base station sends a third air interface transmission (that is, a downlink transmission including the downlink data) to the terminal, where the downlink data is scrambled by the terminal-specific RNTI. The downlink transmission may further include updated timing advance information for the terminal.

At operation 4, after receiving the downlink data, the terminal sends a fourth air interface transmission (that is, an uplink transmission scrambled by the terminal-specific RNTI) to the base station. The uplink transmission may include uplink physical layer determination, media access control (MAC) layer determination, RRC layer determination or application layer determination of the received downlink data by the terminal.

However, in the basic procedure of MT-EDT shown in FIG. 1 above, there are mainly the following five problems:
Problem 1

In the first air interface transmission, an SI paging message may usually include paging records for a plurality of terminals. Under a condition that a paging record for a terminal needs to carry complete related information of a non-contention-based random access resource and related information of a terminal-specific RNTI, which may take up tens of bits or even more, the paging record that can be accommodated in the SI paging message may be reduced, and therefore paging capacity is reduced.

Some common solutions that can be used to optimize information carried in paging records are described below.

Solution 1-1: for an eMTC terminal, the SI paging message carries a dedicated offset of a fixed length (for example, 3 bits-4 bits) allocated by the base station for an access preamble in the non-contention-based random access resource. The terminal superimposes the dedicated offset on a maximum contention-based random access preamble to obtain a dedicated non-contention-based random access preamble, that is, CF preamble=numberOfRA-Preambles+ preamble index. A range of the dedicated offset determines a maximum number of non-contention-based random access that may be supported. The base station may ensure, to the greatest extent, that different dedicated offsets are allocated to different terminals using an MT-EDT function at the same time, and ensure that a non-contention-based random access preamble computed by a terminal does not collision with a random access preamble of a terminal using a non-contention-based random access resource due to other functions (such as non-contention-based random access triggered by physical downlink control channel order (PDCCH order)).

Solution 1-2: for the eMTC terminal, in order to further save the dedicated offset of 3 bits-4 bits carried in the SI paging message, the terminal may also compute a dedicated offset for an access preamble in the non-contention-based random access resource by terminal, for example, an identifier of the terminal (UE ID) is used to conduct a modulo operation to obtain a maximum number of the dedicated offset, that is, CF preamble=numberOfRA-Preambles+ UEID mod (64−numberOfRA-Preambles). However, a problem of the solution is that different terminals using the MT-EDT function at the same time possibly obtain the same dedicated offset through a modulo operation, leading to unexpected collisions. Moreover, a dedicated offset computed by the terminal cannot ensure that a finally obtained random access preamble does not collision with the random access preamble of the terminal using the non-contention-based random access resource due to other functions (such as the non-contention-based random access triggered by PDCCH order).

Considering the problems of Solution 1-2, Solution 1-1 may be used. However, because the non-contention-based random access preamble is shared among a plurality of functions, it is difficult for an offset of a fixed length to meet two requirements of avoiding collisions between terminals using the function and between a terminal using the function and terminals using other functions at the same time. Generally speaking, in order to reduce collisions between terminals using the function, the larger the length or range of the offset, the better, which may result in less offsets available for other functions. Moreover, under a condition that there are fewer terminals using the function, resources may be wasted, and carrying a dedicated offset of a fixed length in the SI paging message may further cause unnecessary signaling overhead.

In addition, the above-mentioned common solution 1-1 mainly can be used to optimize the signaling overhead of the first air interface transmission when the eMTC terminal uses the MT-EDT function. For a multi-carrier NB-IoT system, referring to a non-contention-based random access function triggered by PDCCH order, it may be concluded that the non-contention-based random access resource further needs to include an initial carrier number assigned by the base station and an initial subcarrier number on the carrier. Under a condition that the carrier number (4 bits) and the subcarrier number (6 bits) are included in related information of the non-contention-based random access resource of a paging signal, overhead of 10 bits may be caused. There is no solution to optimize the overhead.

Problem 2

In the first air interface transmission, the base station may carry the terminal-specific (i.e., non-contention-based) random access resource and the related information of the terminal-specific RNTI for identifying uplink and downlink transmission of the terminal in the SI paging message. It is known that for eMTC and NB-IoT systems, random access resources of the systems are configured according to coverage levels (or transmission repetition times), that is, different coverage levels may correspond to different random access resources. Since the base station cannot accurately obtain a coverage level of an idle terminal, it is likely that the base station may select a random access resource corresponding to a maximum coverage level or a coverage level used by the terminal during a previous connection release, put the random access resource in the SI paging message and send the random access resource to the terminal. Under a condition that the terminal moves to an area with a very good coverage condition or an area that changes compared with a coverage conditions during the previous connection release, it is likely that the terminal may waste the random access resource.

Aiming at the above problems, a common optimization method is that the base station configures a plurality of sets of dedicated random access resources for the terminal, so that the terminal may select a most suitable resource according to an actual coverage situation, and the base station may obtain a resource actually used by the terminal through blind detection. However, considering that carrying a plurality of sets of random access resources in the SI paging message may cause larger signaling overhead, and a coverage level of a static terminal usually does not change, providing two or more sets of random access resources for different coverage levels currently may cause resource waste and unnecessary signaling overhead in some scenarios.

Problem 3

In the above-mentioned basic procedure of MT-EDT, after receiving the random access preamble sent from the terminal on the non-contention-based random access resource, the base station triggers the related procedure to ask the core network for downlink data of the terminal, and then the base station sends the third air interface transmission to the terminal, which is the downlink transmission including the downlink data. After sending the random access preamble, the terminal receives the third air interface transmission, which is similar to a traditional random access process that the terminal receives a random access response (RAR) message after sending the random access preamble, but is different from this traditional random access process in the following aspects.

After sending the random access preamble, the terminal starts to detect the RAR at short intervals (the fixed number of subframes, such as 3 subframes). However, for the MT-EDT function, because the base station needs to obtain data from the core network before sending the third air interface transmission, under a condition that the terminal moves to a new small cell after the previous connection release, the terminal sends the random access preamble at a new base station, and the above-mentioned data acquisition process may further include a process that the new base station acquires a terminal context from an old base station, which may further delay a process of sending the third air interface transmission by the base station. In order to avoid power consumption caused by unnecessary detection, it is better for the terminal to wait for a period of time before detecting the third air interface transmission after sending the random access preamble.

In addition, in the traditional random access process, because the RAR message is short, and in order to avoid collisions among a plurality of terminals detecting RAR messages scrambled by a random access-radio network temporary identifier (RA-RNTI), the terminal needs to receive RAR messages in an RAR message receiving window (RAR window) of a certain length. In the MT-EDT function, the third air interface transmission is likely to be much larger than the RAR message because the third air interface transmission includes the downlink data, so an original RAR message detecting window is no longer suitable for the terminal to receive the third air interface transmission.

Aiming at the above problems, a common optimization method is to configure an extended RAR response receiving window for the terminal to determine time required for receiving the third air interface transmission, and to configure a new offset relative to an end of the second air interface transmission to determine an initial position for receiving the third air interface transmission. Generally, the extended receiving windows and offsets should be configured by means of broadcast signals. However, considering change of a terminal state, a set of fixed extended receiving window and offset configuration cannot meet needs of different scenarios.

Problem 4

In the above-mentioned basic procedure of MT-EDT, after receiving the random access preamble sent from the terminal on the non-contention-based random access resource, the base station triggers the related procedure to ask the core network for downlink data of the terminal, and then the base station sends the third air interface transmission to the terminal, which is the downlink transmission including the downlink data. After receiving the downlink data, the terminal transmits the data to an application layer, and the application layer may inform the terminal that uplink data needs to be transmitted to serve as a confirmation or response to the received downlink data. For example, in some applications, the downlink data may be a network command that triggers the terminal to report the stored operation data, abnormal reports and other information, which may be large.

Generally, a network may include an uplink authorization in the third air interface transmission, so that the terminal may directly include a small amount of data in the fourth air interface transmission, or send a buffer area state report to apply for a larger uplink authorization. However, in a scenario that the above-mentioned terminal may have large uplink data to serve as a response to the received downlink data, efficiency of using the above-mentioned method is low.

An MO-EDT standard of the related technology additionally supports a network side to determine whether to roll from an MO-EDT process back to an ordinary connection establishment process according to whether the terminal reports release auxiliary information (which indicates whether the terminal has cached uplink data to send) and whether the network side has cached data, that is, the network side controls the terminal to be transferred to a connected state and transmits more service data in the connected state. In the procedure, the terminal usually sends access stratum (AS) or non-access stratum (NAS) release auxiliary information to the network along with a first uplink RRC message, and the network may use a first downlink RRC message to roll the terminal back to the connected state. Similar solutions are further mentioned in MT-EDT related discussions. Under a condition that the network knows that more downlink data needs to be sent to the terminal before sending the third air interface transmission, the network side may send a downlink RRC message to roll the terminal back to the connected state when sending the third air interface transmission. However, the procedure cannot be applied to the situation that the above-mentioned terminal further finds that there is a large amount of uplink data to be transmitted after receiving the third air interface transmission.

Problem 5

In the basic procedure of the above-mentioned MT-EDT, all terminals may receive the first air interface transmission and analyze the SI paging message and the paging record that the SI paging message contains. There may be malicious pseudo-terminals here, and a dedicated random access preamble is sent to the base station by using related information of a dedicated random access resource provided in a paging record for a target terminal. After receiving the random access preamble, the base station cannot identify whether the random access preamble comes from a real target terminal. The base station may estimate uplink timing advance (TA) according to the received random access preamble, obtain downlink service data for a terminal from the core network, include the contents in the second air interface transmission and send the contents to the terminal.

For a user plane (UP) CIoT EPS optimization solution of an evolved packet system (EPS) of a cellular Internet of Things (CIoT) in a user plane, the base station may obtain a security key of the terminal and encrypt downlink service data in AS. The second air interface transmission may still be received by a pseudo-terminal, but service data in the transmission cannot be analyzed by the pseudo-terminal because the data is encrypted in NAS (a control plane (CP) CIoT EPS optimization solution or AS is encrypted). Because of existence of the pseudo-terminal, if the terminal is only required to send physical layer or MAC layer determination after receiving the second air interface transmission, although the pseudo-terminal cannot analyze the downlink service data, the pseudo-terminal may still forge uplink determination, which may cause the base station or the core network to mistakenly determine that the data has been received by the target terminal.

In order to ensure that the base station and the core network may accurately determine that the service data is delivered to the target terminal, some common optimization solutions include: for a CP solution, the terminal should send an uplink NAS protocol data unit (PDU) (including an NAS signal or NAS data) to check terminal determination the NAS, and for a UP solution, the terminal should send an encrypted uplink RRC signal to check the terminal determination at the AS. However, the problem of the above-mentioned solution is that for the CP solution, it is possible to define a new NAS signal, and for the UP solution, the uplink RRC signal possibly requires a further downlink RRC signal for determination, resulting in unnecessary signaling load, which further reduces advantages of the solution compared with traditional data transmission solutions.

Some embodiments of the present application provide a mobile communication network (including but not limited to 5th Generation (5G)). A network structure of the network may include network-side equipment (such as one or more types of base stations, a transmission node, an access point (AP), a relay, a node B (NB), universal terrestrial radio access (UTRA), and evolved universal terrestrial radio access (EUTRA)), and terminals (UE, a user equipment data card, a relay, mobile equipment, etc.). The embodiments of the present application provide a data transmission method and apparatus, and a computer-readable storage medium, which are capable of running on the above-mentioned network structure, thus optimizing a signaling process of MT-EDT, reducing signaling overhead and ensuring security and efficiency of data transmission.

The data transmission method and apparatus are described below.

FIG. 2 shows a schematic flowchart of the data transmission method provided in an embodiment. As shown in FIG. 2, the method provided in the embodiment may be implemented by a first communication node, and the first communication node may be a terminal (such as UE and mobile equipment). The method includes the following operation S110.

At operation S110, the first communication node receives first information sent from a second communication node, where the first information includes configuration information of a transmission resource.

The configuration information of the transmission resource includes at least one of the following information: offset configuration information of a dedicated resource; frequency domain resource information of a non-contention-based random access resource; a mapping relation between a resource for detecting a first air interface transmission and a non-contention-based random access resource; offset configuration information of frequency domain resource information of a non-contention-based random access resource; offset configuration information of time domain resource information of a non-contention-based random access resource; at least two sets of downlink transmission reception timer configuration information for different types of first communication nodes; and usage mode information of a random access resource.

In an embodiment, FIG. 3 shows a schematic flowchart of another data transmission method provided in an embodiment. As shown in FIG. 3, in addition to the above-mentioned S110, the method may further include the following operations S120 and S130.

At operation S120, the first communication node obtains an offset of a transmission resource within a range of the configuration information of the transmission resource.

The configuration information of the transmission resource includes at least one of a length and a range of the offset of the transmission resource, that is, the offset of the transmission resource within the range of the configuration information of the transmission resource is not larger than the length and the range of the offset of the transmission resource.

The transmission resource includes at least one of the following resources: a random access resource, a contention-based random access resource, a non-contention-based random access resource, an uplink transmission authorized resource, a downlink transmission grant resource, a grant-free resource, a grant-free uplink transmission resource, a grant-free downlink transmission resource, a random access preamble in a random access resource, and a cell-radio network temporary identifier (C-RNTI) designated by a terminal; and radio network temporary identifiers (RNTI) of different types.

The manner that the first communication node obtains the offset of the transmission resource includes at least one of the following two manners.

Manner 1, the first communication node receives the offset of the transmission resource within the range of the configuration information of the transmission resource, which is sent from the second communication node in a broadcast message or a dedicated message (the offset may be positive, zero or negative).

Manner 2, the first communication node determines the offset of the transmission resource within the range of the configuration information of the transmission resource according to a terminal identifier and a cell identifier (for example, the terminal may conduct a modulo operation using a terminal feature identifier (ID) as a dividend and the length or the range of the offset of the transmission resource as a divisor, so as to obtain the offset of the transmission resource).

At operation S130, the first communication node determines an initial position X of the transmission resource, and superimposes the offset of the transmission resource on the initial position X to obtain a position, which is equal to X+offset, of an actually used transmission resource.

The initial position X is determined according to at least one of a terminal identifier and a cell identifier.

The embodiment may be used for determining the position of the transmission resource, so as to enable the first communication node to send a subsequent message (such as a second air interface transmission) at the position of the transmission resource.

In an embodiment, for Problem 1, the configuration information of the transmission resource includes offset configuration information of a dedicated resource; the offset configuration information of the dedicated resource includes at least one of a length and a range of an offset of the dedicated resource. The method further includes the following three operations 1 to 3.

At operation 1, the first communication node determines an effective value of the offset of the dedicated resource according to at least one of the length and the range of the offset of the dedicated resource.

At operation 2, the first communication node determines the dedicated resource according to the effective value of the offset of the dedicated resource.

At operation 3, the first communication node sends a second air interface transmission (message 1) to a second communication node according to the dedicated resource after receiving a first air interface transmission (message 0) sent from the second communication node.

The configuration information of the transmission resource includes the offset configuration information of the dedicated resource; and the offset configuration information of the dedicated resource includes at least two sets of offset configuration information of the dedicated resource for first communication nodes with different functions, and each set of offset configuration information of the dedicated resource includes at least one of the length and the range of the offset of the dedicated resource.

A function using the dedicated resource is at least one of the following functions: handover, physical layer downlink control channel order (PDCCH order), early data transmission (EDT), MO-EDT and MT-EDT; and the function is one of contents of the offset configuration information of the dedicated resource.

The dedicated resource includes at least one of a non-contention-based random access resource, a dedicated random access resource and a dedicated terminal identifier.

The non-contention-based random access resource or dedicated random access resource includes at least one of the following parameters: a random access preamble in an eMTC system; a carrier number and a subcarrier number in a random access frequency domain resource in an NB-IoT system; a random access time domain resource; and a random access resource based on a single side band (SSB) in a new radio (NR) system (such as the number of SSBs at each random access moment or a random access preamble on each SSB).

The dedicated terminal identifier includes at least one of the following parameters: C-RNTI designated by a terminal; and RNTI of another type.

In an embodiment, for Problem 1, in a multi-carrier NB-IoT system, the configuration information of the transmission resource includes the frequency domain resource information of the non-contention-based random access resource, and the frequency domain resource information of the non-contention-based random access resource includes at least one of an initial carrier list and an initial subcarrier list; the initial carrier list includes N carriers, the initial subcarrier list includes T subcarriers, and N and T are positive integers. The method further includes at least one of the following two operations 1 and 2.

At operation 1, a first communication node conducts a modulo operation using a carrier number for detecting a first air interface transmission at a current moment as a dividend and N as a divisor to determine an initial carrier number of the non-contention-based random access resource; and the first communication node sends a second air interface transmission to the second communication node according to the initial carrier number of the non-contention-based random access resource after receiving the first air interface transmission sent from the second communication node.

At operation 2, the first communication node conducts a modulo operation using a subcarrier number for detecting a first air interface transmission at a current moment as a dividend and T as a divisor to determine an initial subcarrier number of the non-contention-based random access resource; and the first communication node sends a second air interface transmission to the second communication node according to the initial subcarrier number of the non-contention-based random access resource after receiving the first air interface transmission sent from the second communication node.

In an embodiment, for Problem 1, in a multi-carrier NB-IoT system, the configuration information of the transmission resource includes the mapping relation between the resource for detecting the first air interface transmission and the non-contention-based random access resource. The method further includes the following two operations 1 and 2.

At operation 1, a first communication node determines the non-contention-based random access resource according to a carrier for detecting a first air interface transmission at a current moment and the mapping relation between the resource for detecting the first air interface transmission and the non-contention-based random access resource.

At operation 2, the first communication node sends a second air interface transmission to the second communication node according to the non-contention-based random access resource after receiving the first air interface transmission sent from the second communication node, and the non-contention-based random access resource includes at least one of an initial carrier number and an initial subcarrier number of the non-contention-based random access resource.

In an embodiment, for Problem 1, in a multi-carrier NB-IoT system, the configuration information of the transmission resource includes the offset configuration information of the frequency domain resource information of the non-contention-based random access resource, the offset configuration information of the frequency domain resource information of the non-contention-based random access resource includes N carriers, and N is a positive integer; under a condition that $m_i$ subcarrier resources are configured on each carrier i, subcarrier resources on the carriers are arranged together (for example, in a cascade mode or a combination mode), so as to obtain an initial frequency domain resource group of the non-contention-based random access resource for non-contention-based random access, and the resource group includes M resources, and $M=\Sigma_{i=1}^{N}m_i$. The method further includes the following operations.

The first communication node sends a second air interface transmission to the second communication node according to an initial frequency domain resource of the non-contention-based random access resource after receiving a first air interface transmission sent from the second communication node. The initial frequency domain resource of the non-contention-based random access resource is obtained through at least one of the following manners. The first communication node determines an offset of the frequency domain resource information of the non-contention-based random access resource according to the offset configuration information of the frequency domain resource information of the non-contention-based random access resource; and the first communication node obtains the initial frequency domain resource of the non-contention-based random access resource from the initial frequency domain resource group of the non-contention-based random access resource according to the offset of the frequency domain resource information of the non-contention-based random access resource. The first communication node conducts a modulo operation using a terminal identifier as a dividend and M as a divisor to determine the initial frequency domain resource of the non-contention-based random access resource. The first communication node conducts, under a condition that a carrier quantity of the first air interface transmission is larger than M, a modulo operation using a carrier number for detecting the first air interface transmission at a current moment as a dividend and M as a divisor to determine the initial frequency domain resource of the non-contention-based random access resource. The first communication node conducts, under a condition that a carrier quantity of the first air interface transmission is smaller than M, a modulo operation using each resource number in the initial frequency domain resource group of the non-contention-based random access resource as a dividend and the carrier quantity for detecting the first air interface transmission as a divisor to determine the initial frequency domain resource of the non-contention-based random access resource.

The above solution is equivalent to mapping a plurality of non-contention-based initial frequency domain resources to a paging carrier. In addition, the first communication node receives an offset corresponding to a non-contention-based initial frequency domain resource carried in the first air interface transmission, and according to the offset, the first communication node may obtain a determined non-contention-based initial frequency domain resource from a plurality of non-contention-based initial frequency domain resources corresponding to a currently detected paging carrier.

The first communication node extracts an initial carrier number for non-contention-based random access and an initial subcarrier number on the carrier according to the determined non-contention-based initial frequency domain resource and an arrangement mode of resources.

In an embodiment, for Problem 2, the configuration information of the transmission resource includes the usage mode information of the random access resource; the usage mode information of the random access resource includes at least one of the following information:

each piece of usage mode information of the random access resource corresponds to a set of random access resource; the usage mode information of the random access resource is used for marking a coverage level of the random access resource; and the usage mode information of the random access resource is used for marking a feature of an uplink transmission after the first communication node uses the random access resource to send a second air interface transmission. The method further includes the following operation.

The first communication node selects a set of random access resource to send a second air interface transmission to the second communication node after receiving a first air interface transmission sent from the second communication node.

The signaling overhead occupied by a plurality of sets of random access resource configurations may provide as much information as possible. For example, different random access resources may be used for distinguishing whether the first communication node needs to send additional uplink data in a fourth air interface transmission after receiving downlink data.

In the embodiment, a network sends feature information of the first communication node (such as subscription based UE differentiation information) or state information to the second communication node in an SI paging message, or the second communication node stores some feature information or state information of a terminal in a context of an access stratum of the first communication node during previous connection release. After receiving the SI paging message sent from a core network, the second communication node sends related information of a plurality of sets of random access resources in the SI paging message to the first communication node, and the second communication node determines a type of the first communication node according to the feature information or the state information, and marks usage modes of a plurality of sets of random access resources according to the type of the first communication node.

In an embodiment, for Problem 3, the configuration information of the transmission resource includes at least two sets of downlink transmission reception timer configuration information for different types of first communication nodes; each set of downlink transmission reception timer configuration information includes at least one of type information, a timer length and a timer initial position offset; the type information is used for indicating a stationary or non-stationary state of the first communication node, or indicate whether the first communication node is constantly in one cell or moves into the cell from other cells; and the timer initial position offset is set as an offset relative to a previous uplink transmission end position of the first communication node.

The downlink transmission reception timer configuration information may serve as a reference configuration, and the second communication node may further expand different reference configurations to configurations for different coverage levels, which is not specifically limited herein.

In an embodiment, for Problem 5, the method further includes the following two operations 1 and 2.

At operation 1, the first communication node receives a third air interface transmission (message 2) sent from the second communication node.

At operation 2, the first communication node sends a fourth air interface transmission (message 3) to the second communication node, and the fourth air interface transmission includes an identifier of the first communication node.

The identifier of the first communication node includes at least one of an NAS identifier (such as a serving-temporary mobile subscriber identifier (S-TMSI)) and a resume ID. The identifier of the first communication node is used for verification of a target first communication node by the second communication node.

After receiving the identifier of the first communication node, the second communication node compares the identifier with a stored identifier of the first communication node associated with the SI paging message, and under a condition that the identifier and the stored identifier are consistent, the fourth air interface transmission is considered to be from the target first communication node. In the embodiment, a new uplink NAS signal or RRC signal is not introduced, so an additional downlink NAS or RRC determination signal may be avoided, thus reducing the signaling overhead.

The identifier of the first communication node may be included in an uplink media access control (MAC) control element (CE), or may be added to uplink service data (such as uplink service data used for determining downlink service data and sent from an application layer).

The first air interface transmission mentioned in the embodiments may be an SI paging message. The second air interface transmission in the embodiments may be at least one of a random access message and a random access preamble. The third air interface transmission in the embodiments may be at least one of downlink data information, a random access response message and a random access preamble response. The fourth air interface transmission in the embodiments may be at least one of an uplink message and uplink data information.

The first information may be at least one of a broadcast message, a dedicated message, a unicast message and a configuration signaling.

FIG. 4 shows a schematic flowchart of another data transmission method provided in an embodiment. As shown in FIG. 4, the method provided in the embodiment may be implemented by a second communication node, and the second communication node may be a base station (such as eNB and AP). The method includes the following operation S210.

At operation S210, the second communication node sends first information to a first communication node, and the first information includes configuration information of a transmission resource.

The configuration information of the transmission resource includes at least one of the following information: offset configuration information of a dedicated resource; frequency domain resource information of a non-contention-based random access resource; a mapping relation between a resource for detecting a first air interface transmission and a non-contention-based random access resource; offset configuration information of frequency domain resource information of a non-contention-based random access resource; offset configuration information of time domain resource information of a non-contention-based random access resource; at least two sets of downlink transmission reception timer configuration information for different types of first communication nodes; and usage mode information of a random access resource.

In an embodiment, for Problem 1, the configuration information of the transmission resource includes the offset configuration information of the dedicated resource; the offset configuration information of the dedicated resource includes at least one of a length and a range of an offset of the dedicated resource. The method further includes the following operations: the second communication node receives a second air interface transmission (message 1) sent from the first communication node according to the dedicated resource after sending a first air interface transmission (message 0) to the first communication node.

The configuration information of the transmission resource includes the offset configuration information of the dedicated resource; and the offset configuration information of the dedicated resource includes at least two sets of offset configuration information of the dedicated resource for first communication nodes with different functions, and each set of offset configuration information of the dedicated resource includes at least one of the length and the range of the offset of the dedicated resource.

A function using the dedicated resource is at least one of the following functions: handover, PDCCH order, EDT, MO-EDT and MT-EDT; and the function is one of contents of the offset configuration information of the dedicated resource.

The dedicated resource includes at least one of a non-contention-based random access resource, a dedicated random access resource and a dedicated terminal identifier.

The non-contention-based random access resource or dedicated random access resource includes at least one of the following parameters: a random access preamble in an eMTC system; a carrier number and a subcarrier number in a random access frequency domain resource in an NB-IoT system; a random access time domain resource; and a random access resource based on SSB in an NR system (such as the number of SSBs at each random access moment or a random access preamble on each SSB).

The dedicated terminal identifier includes at least one of the following parameters: C-RNTI designated by a terminal; and RNTI of another type.

In an embodiment, for Problem 1, in a multi-carrier NB-IoT system, the configuration information of the transmission resource includes the frequency domain resource information of the non-contention-based random access resource, and the frequency domain resource information of the non-contention-based random access resource includes at least one of an initial carrier list and an initial subcarrier list; the initial carrier list includes N carriers, the initial subcarrier list includes T subcarriers, and N and T are positive integers.

The method further includes at least one of the following two operations 1 and 2.

At operation 1, after sending a first air interface transmission to the first communication node, the second communication node receives a second air interface transmission sent from the first communication node according to an initial carrier number of the non-contention-based random access resource.

At operation 2, after sending a first air interface transmission to the first communication node, the second communication node receives a second air interface transmission sent from the first communication node according to an initial subcarrier number of the non-contention-based random access resource.

In an embodiment, for Problem 1, in a multi-carrier NB-IoT system, the configuration information of the transmission resource includes the mapping relation between the resource for detecting the first air interface transmission and the non-contention-based random access resource. The method further includes the following operations.

After sending a first air interface transmission to the first communication node, the second communication node receives a second air interface transmission sent from the first communication node according to the non-contention-based random access resource, and the non-contention-based random access resource includes at least one of an initial carrier number and an initial subcarrier number of the non-contention-based random access resource.

In an embodiment, for Problem 1, in a multi-carrier NB-IoT system, the configuration information of the transmission resource includes offset configuration information of frequency domain resource information of the non-contention-based random access resource, the offset configuration information of the frequency domain resource information of the non-contention-based random access resource includes N carriers, and N is a positive integer; under a condition that $m_i$ subcarrier resources are configured on each carrier i, an initial frequency domain resource group of the non-contention-based random access resource includes M resources, and $M=\Sigma_{i=1}^{N} m_i$. The method further includes the following operations.

After sending a first air interface transmission to the first communication node, the second communication node receives a second air interface transmission sent from the first communication node according to an initial frequency domain resource of the non-contention-based random access resource.

In an embodiment, for Problem 2, the configuration information of the transmission resource includes the usage mode information of the random access resource; the usage mode information of the random access resource includes at least one of the following information:

each piece of usage mode information of the random access resource corresponds to a set of random access resource; the usage mode information of the random access resource is used for marking a coverage level of the random access resource; and the usage mode information of the random access resource is used for marking a feature of an uplink transmission after the first communication node uses the random access resource to send a second air interface transmission. The method further includes the following operation.

After sending a first air interface transmission to the first communication node, the second communication node receives a second air interface transmission sent from the first communication node according to a selected set of random access resource.

In an embodiment, for Problem 3, the configuration information of the transmission resource includes the at least two sets of downlink transmission reception timer configuration information for different types of first communication nodes; each set of downlink transmission reception timer configuration information includes at least one of type information, a timer length and a timer initial position offset.

The type information is used for indicating a stationary or non-stationary state of a first communication node, or indicate whether the first communication node is constantly in one cell or moves into the cell from other cells; and the timer initial position offset is set as an offset relative to a previous uplink transmission end position of the first communication node.

In an embodiment, for Problem 5, the method further includes the following two operations 1 and 2.

At operation 1, the second communication node sends a third air interface transmission (message 2) to the first communication node.

At operation 2, the second communication node receives a fourth air interface transmission (message 3) sent from the first communication node, and the fourth air interface transmission includes an identifier of the first communication node.

The identifier of the first communication node includes at least one of an NAS identifier (such as S-TMSI) and a resume ID. The identifier of the first communication node is used for verification of a target first communication node by the second communication node.

The first air interface transmission in the embodiment may be an SI paging message. The second air interface transmission in the embodiment may be at least one of a random access message and a random access preamble. The third air interface transmission in the embodiment may be at least one of downlink data information, a random access response message and a random access preamble response. The fourth air interface transmission in the embodiment may be at least one of an uplink message and uplink data information.

The first information may be at least one of a broadcast message, a dedicated message, a unicast message and a configuration signaling.

Figure 5:
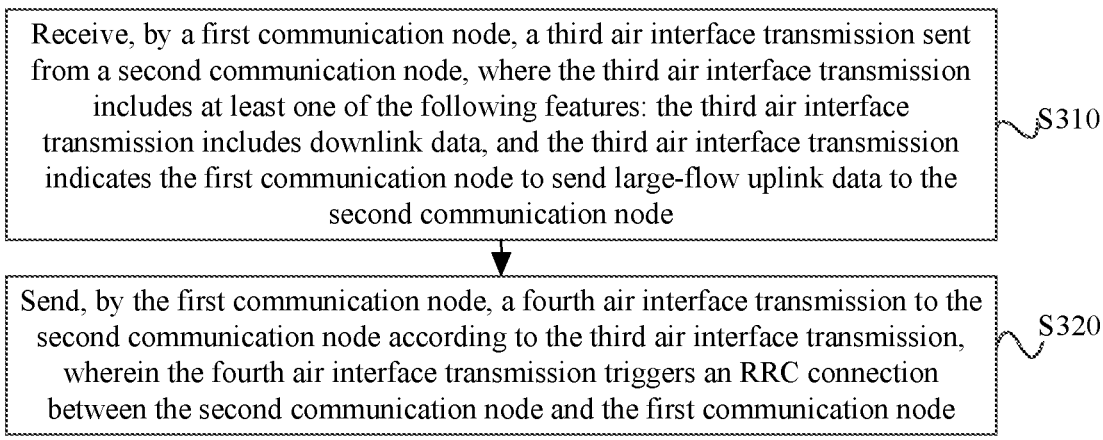
FIG. 5 is a schematic flowchart of another data transmission method provided in an embodiment.

FIG. 5 shows a schematic flowchart of another data transmission method provided in an embodiment. As shown in FIG. 5, the method provided in the embodiment may be implemented by a first communication node, and the first communication node may be a terminal (such as UE and mobile equipment). The method mainly can be used to solve Problem 4, and includes the following operations S310 and S320.

At operation S310, the first communication node receives a third air interface transmission (message 2) sent from a second communication node, and the third air interface transmission includes at least one of the following features: the third air interface transmission includes downlink data, and the third air interface transmission indicates the first communication node to send large-flow uplink data to the second communication node.

S320, the first communication node sends a fourth air interface transmission (message 3) to the second communication node according to the third air interface transmission, where the fourth air interface transmission triggers an RRC connection between the second communication node and the first communication node.

The first communication node initiates a rollback procedure in the fourth air interface transmission to trigger the RRC connection between the second communication node and the first communication node.

The first communication node has used a dedicated random access resource for access in a second air interface transmission, so a rollback procedure signal initiated by the first communication node no longer needs to include collision resolution related information. Then, because a data transmission channel has already existed between the first communication node and the second communication node, (for a control plane (CP) solution, at least a signal resource bearer (SRB) 0 may be used or SRB1 may be established and used for data transmission, and for a user plane (UP) solution, activated data resource bearers (DRB) may be used for data transmission), there is no need to trigger a configuration process of SRB or DRB. Finally, an interface between the second communication node and a network has already existed, the second communication node does not need to trigger a process of S1 interface establishment or resume after receiving a message for completing RRC connection establishment or resume or reconfiguration.

In an embodiment, the fourth air interface transmission includes any one of an RRC connection establishment completion message, an RRC connection resume completion message, or an RRC connection reconfiguration completion message.

In an embodiment, the fourth air interface transmission further includes any one of an RRC connection establishment request message, an RRC connection resume request message, or an RRC connection reconfiguration request message. The method further includes the following two operations 1 and 2.

At operation 1, the first communication node receives a fifth air interface transmission (message 4) sent from the second communication node, and the fifth air interface transmission includes any one of an RRC connection establishment message, an RRC connection resume message, or an RRC connection reconfiguration message.

At operation 2, the first communication node sends a sixth air interface transmission to the second communication node according to the fifth air interface transmission, and the sixth air interface transmission includes any one of an RRC connection establishment completion message, an RRC connection resume completion message, or an RRC connection reconfiguration completion message.

In an embodiment, for Problem 5, the fourth air interface transmission includes an identifier of a first communication node. The identifier of the first communication node includes at least one of an NAS identifier (such as S-TMSI) and a resume ID. The identifier of the first communication node is used for verification of a target first communication node by the second communication node.

After receiving the identifier of the first communication node, the second communication node compares the identifier with a stored identifier of the first communication node associated with an SI paging message, and under a condition that the identifier and the stored identifier are consistent, the fourth air interface transmission is considered to be from a target first communication node. In the embodiment, a new uplink NAS signal or RRC signal is not introduced, so an additional downlink NAS or RRC determination signal may be avoided, thus reducing the signaling overhead.

Figure 6:
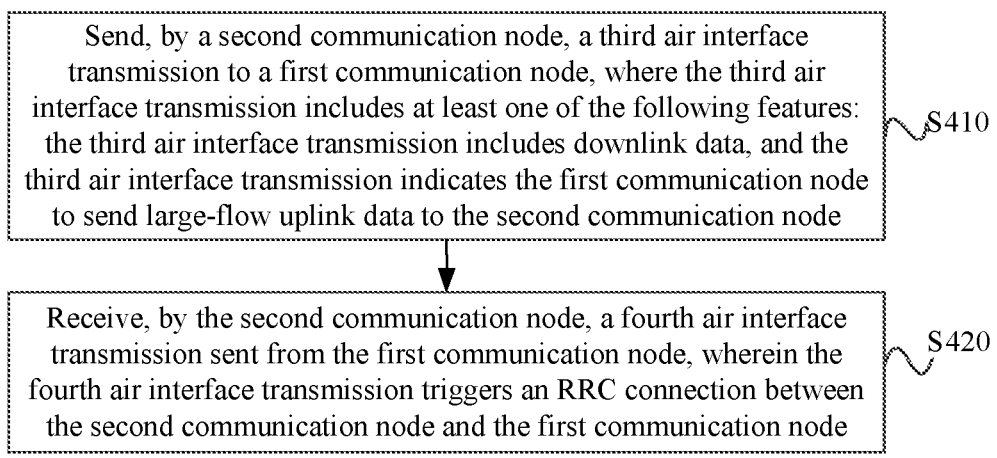
FIG. 6 is a schematic flowchart of another data transmission method provided in an embodiment.

FIG. 6 shows a schematic flowchart of another data transmission method provided in an embodiment. As shown in FIG. 6, the method provided in the embodiment may be implemented by a second communication node, and the second communication node may be a base station (such as eNB and AP). The method mainly can be used to solve Problem 4, and includes the following operations S410 and S420.

At operation S410, the second communication node sends a third air interface transmission (message 2) to a first communication node, and the third air interface transmission includes at least one of the following features: the third air interface transmission includes downlink data, and the third air interface transmission indicates the first communication node to send large-flow uplink data to the second communication node.

At operation S420, the second communication node receives a fourth air interface transmission (message 3) sent from the first communication node, where the fourth air interface transmission triggers an RRC connection between the second communication node and the first communication node.

The first communication node initiates a rollback procedure in the fourth air interface transmission to trigger the RRC connection between the second communication node and the first communication node.

In an embodiment, the fourth air interface transmission includes any one of an RRC connection establishment completion message, an RRC connection resume completion message, or an RRC connection reconfiguration completion message.

In an embodiment, the fourth air interface transmission further includes any one of an RRC connection establishment request message, an RRC connection resume request message, or an RRC connection reconfiguration request message. The method further includes the following two operations 1 and 2.

At operation 1, the second communication node sends a fifth air interface transmission (message 4) to the first communication node, and the fifth air interface transmission includes any one of an RRC connection establishment message, an RRC connection resume message, or an RRC connection reconfiguration message.

At operation 2, the second communication node receives a sixth air interface transmission sent from the first communication node, and the sixth air interface transmission includes any one of an RRC connection establishment completion message, an RRC connection resume completion message, or an RRC connection reconfiguration completion message.

In an embodiment, for Problem 5, the fourth air interface transmission includes an identifier of a first communication node. The identifier of the first communication node includes at least one of an NAS identifier (such as S-TMSI) and a resume ID. The identifier of the first communication node is used for verification of a target first communication node by the second communication node.

Taking the first communication node as a terminal and the second communication node as a base station as examples, some exemplary embodiments are listed to illustrate the data transmission method provided in the embodiments of the present application.

In a first exemplary embodiment, a terminal receives a length or a range of an offset of a non-contention-based random access preamble for an MT-EDT function which are configured in a system message by a network. When there are fewer terminals using the MT-EDT function, the length or range of the offset may be set to be small, such as 2 bits, which occupies less paging signaling overhead. When there are more terminals using the MT-EDT function, the length or range of the offset may be set to be large, such as 5 bits, so as to support non-contention-based random access of more terminals. According to the configured length or range of the offset of the non-contention-based random access preamble, based on the above-mentioned solution 1-1, the base station may include different offsets of the non-contention-based random access preamble, not larger than the length or range, allocated to different terminals in a paging signal, and the terminals may obtain an actually used non-contention-based random access preamble according to an initial value or a reference value of a non-contention-based random access preamble (such as a maximum value of a contention-based random access preamble plus 1) and the offset of the non-contention-based random access preamble. Alternatively, based on the above-mentioned solution 1-2, the terminal may conduct a modulo operation using a terminal feature ID as a dividend and the length or range as a divisor to obtain an offset of the non-contention-based random access preamble used by the terminal.

In a second exemplary embodiment, a terminal receives lengths or ranges of a plurality of offsets of the non-contention-based random access preamble for a plurality of functions (such as a MT-EDT function or a random access function triggered by PDCCH order) configured in a system message by a network; or the network segments all available offsets of the non-contention-based random access preamble and provides the offsets of the non-contention-based random access preamble to different functions. For example, the MT-EDT function is allocated with an offset length of the non-contention-based random access preamble of 4 bits, and a PDCCH order function is allocated with an offset length of the non-contention-based random access preamble of 2 bits. The base station may include different offsets of the non-contention-based random access preamble, not larger than an offset length or range corresponding to a related function, allocated to different terminals in a paging signal or a PDCCH order signal. Alternatively, based on the above-mentioned solution 1-2, the terminal may conduct a modulo operation using a terminal feature ID as a dividend and the length or range corresponding to the related function as a divisor to obtain an offset of the non-contention-based random access preamble used by the terminal.

In a third exemplary embodiment, a terminal receives at least one of a length or a range of a dedicated C-RNTI offset for an MT-EDT function configured in a system message by a network and an initial value of a dedicated C-RNTI. A base station may include dedicated C-RNTI offsets, not larger than the length or range, allocated to different terminals in a paging signal, and the terminal may obtain actually used dedicated C-RNTI according to the initial value of the dedicated C-RNTI (which is configured by the base station or derived from other RNTI ranges) and the dedicated C-RNTI offset. Alternatively, the terminal may conduct a modulo operation using a terminal feature ID as a dividend and the length or range of the dedicated C-RNTI offset as a divisor to obtain a dedicated C-RNTI offset used by the terminal.

In a fourth exemplary embodiment, a terminal receives lengths or ranges of a plurality of dedicated C-RNTI offsets for a plurality of functions configured in a system message by a network. Alternatively, the network segments all available dedicated C-RNTI offsets and provides the dedicated C-RNTI offsets to different functions.

In a fifth exemplary embodiment, a base station sends related information of a plurality of sets of random access resources to a terminal in an SI paging message, and related information of each set of random access resource may include usage mode information of the random access resource.

After receiving the SI paging message from a core network, the base station determines whether the terminal is a mobile terminal or not according to feature information or state information. Under a condition that the terminal is a mobile terminal, the base station sends the related information of a plurality of sets of random access resources to the terminal in the SI paging message, and uses the usage mode information to mark that the plurality of sets of random access resources correspond to different coverage levels. Under a condition that the terminal is stationary, the base station sends the related information of a plurality of sets of random access resources to the terminal in the SI paging message, and uses the usage mode information to mark that the plurality of sets of random access resources correspond to different fourth air interface transmissions.

For example, the base station sends related information of two sets of random access resources to the terminal in the SI paging message (for distinguishment, the related information of the two sets of random access resources is named a first usage mode and a second usage mode). The first usage mode is used for indicating that the terminal will include data in a subsequent uplink transmission (such as a first uplink transmission after a random access preamble) and needs to request a large uplink authorization. The second usage mode is used for indicating that the terminal does not include data in the subsequent uplink transmission (such as the first uplink transmission after the random access preamble), and a network only needs to allocate a small uplink authorization. Under a condition that the related information of each set of random access resource includes corresponding coverage level information, it may be considered as implicitly indicating that the random access resources correspond to different coverage levels. The above-mentioned usage modes may be further combined, for example, a usage mode indicates that when the terminal uses the set of random access resource, it indicates that the terminal is at a coverage level n and will include data in the uplink transmission after the random access preamble. Another usage mode indicates that when the terminal uses the set of random access resource, it indicates that the terminal is at a coverage level n and will not include data in the uplink transmission after the random access preamble.

After receiving a first air interface transmission (an SI paging message), the terminal selects one of a plurality of sets of coverage levels to initiate random access (that is, sending a second air interface transmission) according to actual requirements.

In a sixth exemplary embodiment, the base station broadcasts two sets of downlink transmission reception timer configuration information. Usage mode information of random access resources marks the two sets of downlink transmission reception timer configuration information respectively (for a stationary terminal and a non-stationary terminal respectively), or the usage mode information of random access resources marks the two sets of downlink transmission reception timer configuration information respectively (for a terminal constantly in the cell or a terminal moving from other cells respectively).

For the downlink transmission reception timer configuration information of the stationary terminal or the terminal constantly in the cell, a timer initial position offset may be set to be small, or a timer duration may be set to be small. For the downlink transmission reception timer configuration information of the non-stationary terminal or the terminal moving from other cells, the timer initial position offset may be set to be large, or a timer duration may be set to be large.

For the non-stationary terminal, the base station may provide downlink transmission reception timer configuration information for a plurality of sets of coverage levels. Under a condition that the terminal moves after a last connection release, the terminal may select downlink transmission reception timer configuration information for the non-stationary terminal and matching a coverage level used during sending the random access preamble by the terminal to receive a third air interface transmission. The base station may further determine whether a paged terminal moves or not and a suitable coverage level according to a situation of receiving a dedicated random access preamble, so as to send the third air interface transmission to the terminal at a suitable timer initial position and within a suitable timer duration range.

Figure 7:
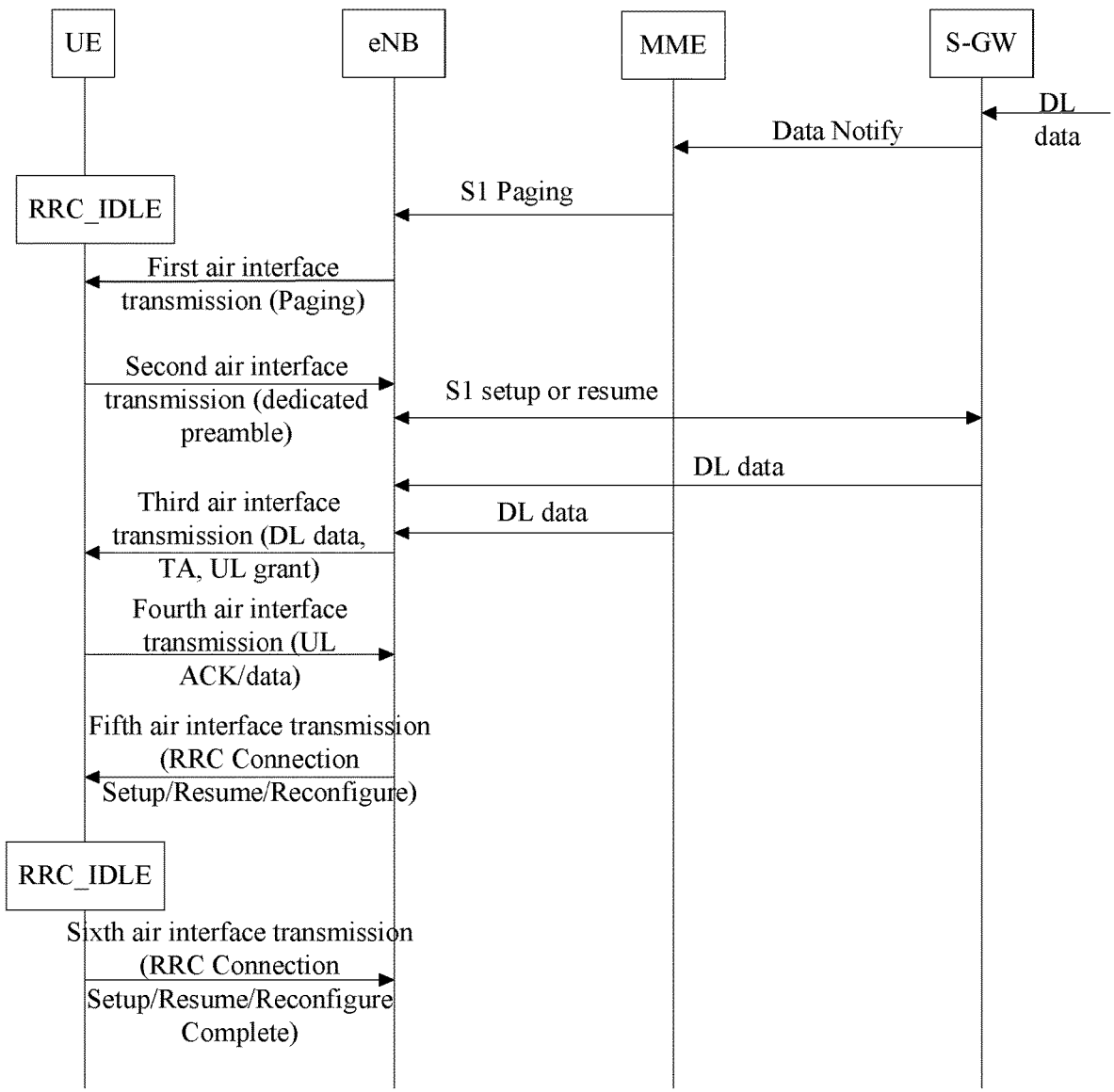
FIG. 7 is a schematic flowchart of a procedure of rolling back from MT-EDT triggered by a terminal provided in an embodiment.

In a seventh exemplary embodiment, FIG. 7 shows a schematic flowchart of a procedure of rolling back from MT-EDT triggered by a terminal provided in an embodiment. The terminal may send any one of an RRC connection establishment request message, an RRC connection resume request message, or an RRC connection reconfiguration request message of related technologies in a fourth air interface transmission to request establishment/resume/reconfiguration of an air interface (such as RRC) connection, and the message may carry part of uplink data or buffer area state report at the same time. After receiving the fourth air interface transmission, a base station sends a fifth air interface transmission to the terminal, which may include an air interface establishment message/resume message/reconfiguration message but does not need to include collision resolution related information, and there is no need to trigger establishment or resume of a connection between the base station and a core network again. After receiving the fifth air interface transmission, the terminal enters a connected state and sends a sixth air interface transmission to the base station, which may include an air interface establishment completion message/resume completion message/reconfiguration completion message.

A terminal using a CP solution may use the seventh exemplary embodiment.

Figure 8:
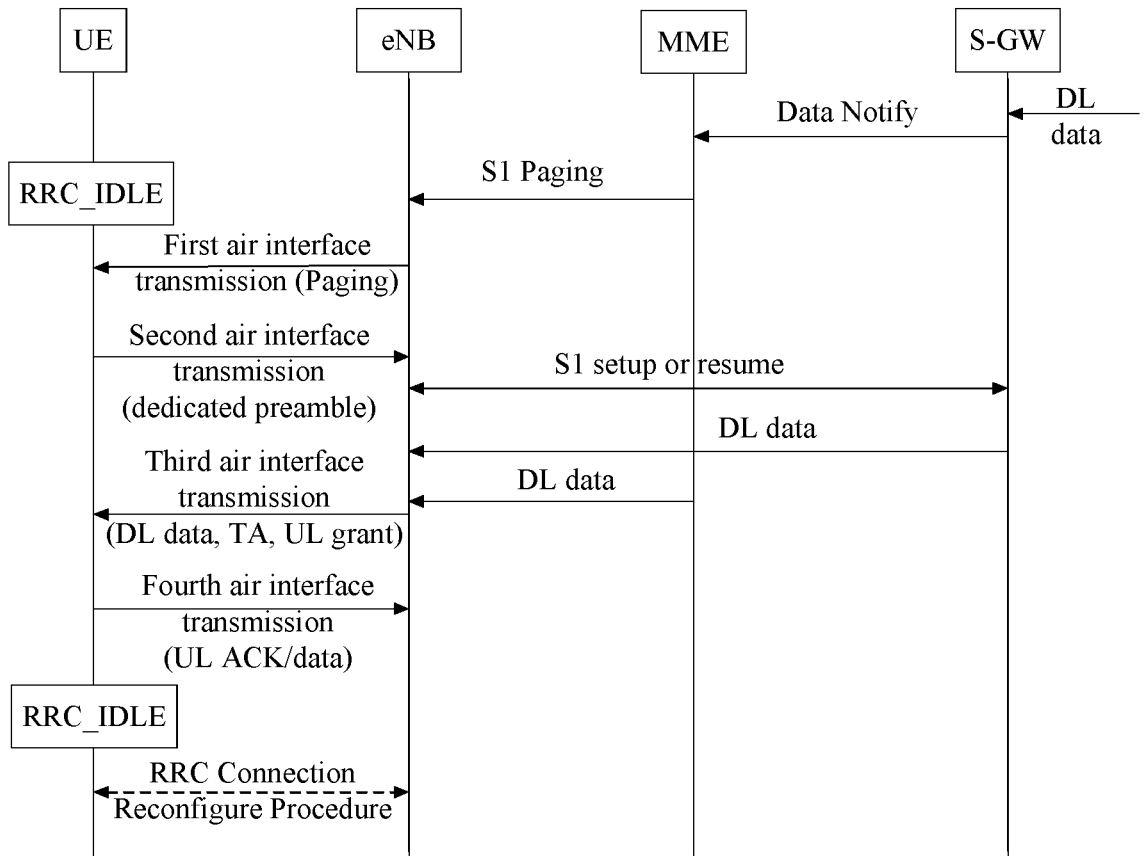
FIG. 8 is a schematic flowchart of another procedure of rolling back from MT-EDT triggered by a terminal provided in an embodiment.

In an eighth exemplary embodiment, FIG. 8 shows a schematic flowchart of another procedure of rolling back from MT-EDT triggered by a terminal provided in an embodiment. The terminal may directly include an air interface establishment completion message/resume completion message/reconfiguration completion message in a fourth air interface transmission and transfers to a connected state. Under a condition that a base station needs to modify a terminal configuration later, an air interface connection reconfiguration process may be initiated.

A terminal using a UP solution may use the eighth exemplary embodiment.

Figure 9:
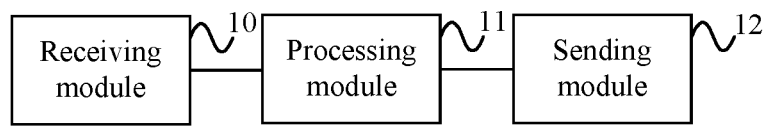
FIG. 9 is a structural schematic diagram of a data transmission apparatus provided in an embodiment.

FIG. 9 shows a structural schematic diagram of a data transmission apparatus provided in an embodiment. The data transmission apparatus may be configured in a first communication node. As shown in FIG. 9, the apparatus includes a receiving module 10. In an embodiment, the apparatus further includes a processing module 11 and a sending module 12.

The receiving module 10 is configured to receive first information sent from a second communication node, and the first information includes configuration information of a transmission resource.

The data transmission apparatus provided in the embodiment is configured to implement the data transmission method of an embodiment shown in FIG. 2 or 3, and an implementation principle of the data transmission apparatus provided in the embodiment is similar to that of the data transmission method, which is not described in details herein.

In an embodiment, the configuration information of the transmission resource includes at least one of the following information:

offset configuration information of a dedicated resource; frequency domain resource information of a non-contention-based random access resource; a mapping relation between a resource for detecting a first air interface transmission and a non-contention-based random access resource; offset configuration information of frequency domain resource information of a non-contention-based random access resource; offset configuration information of time domain resource information of a non-contention-based random access resource; at least two sets of downlink transmission reception timer configuration information for different types of first communication nodes; and usage mode information of a random access resource.

In an embodiment, the configuration information of the transmission resource includes offset configuration information of a dedicated resource; the offset configuration information of the dedicated resource includes at least one of a length and a range of an offset of the dedicated resource; a processing module 11 is configured to determine an effective value of the offset of the dedicated resource according to at least one of the length and the range of the offset of the dedicated resource; the dedicated resource is determined according to the effective value of the offset of the dedicated resource; and a sending module 12 is configured to send a second air interface transmission (message 1) to the second communication node according to the dedicated resource after the receiving module 10 receives a first air interface transmission (message 0) sent from a second communication node.

In an embodiment, the configuration information of the transmission resource includes offset configuration information of a dedicated resource; and the offset configuration information of the dedicated resource includes at least two sets of offset configuration information of the dedicated resource for first communication nodes with different functions, and each set of offset configuration information of the dedicated resource includes at least one of a length and a range of an offset of the dedicated resource.

In an embodiment, a function using a dedicated resource is at least one of the following functions: handover, PDCCH order, EDT, MO-EDT and MT-EDT; and the function is one of contents of offset configuration information of the dedicated resource.

In an embodiment, a dedicated resource includes at least one of a non-contention-based random access resource, a dedicated random access resource and a dedicated terminal identifier.

In an embodiment, a non-contention-based random access resource or a dedicated random access resource includes at least one of the following parameters: a random access preamble in an eMTC system; a carrier number and a subcarrier number in a random access frequency domain resource in an NB-IoT system; a random access time domain resource; and a random access resource based on SSB in an NR system; and a dedicated terminal identifier includes at least one of the following parameters: C-RNTI designated by a terminal; and RNTI of another type.

In an embodiment, the configuration information of the transmission resource includes the frequency domain resource information of the non-contention-based random access resource, and the frequency domain resource information of the non-contention-based random access resource includes at least one of an initial carrier list and an initial subcarrier list; the initial carrier list includes N carriers, the initial subcarrier list includes T subcarriers, and N and T are positive integers; a processing module 11 is configured to conduct a modulo operation using a carrier number for detecting a first air interface transmission at a current moment as a dividend and N as a divisor and determine an initial carrier number of the non-contention-based random access resource; a sending module 12 is configured to send a second air interface transmission to a second communication node according to the initial carrier number of the non-contention-based random access resource after the receiving module 10 receives the first air interface transmission sent from the second communication node; and/or, the processing module 11 is configured to conduct a modulo operation using a subcarrier number for detecting a first air interface transmission at a current moment as a dividend and T as a divisor and determine an initial subcarrier number of the non-contention-based random access resource; and the sending module 12 is configured to send a second air interface transmission to the second communication node according to the initial subcarrier number of the non-contention-based random access resource after the receiving module 10 receives the first air interface transmission sent from the second communication node.

In an embodiment, the configuration information of the transmission resource includes the mapping relation between the resource for detecting the first air interface transmission and the non-contention-based random access resource; a processing module 11 is configured to determine the non-contention-based random access resource according to a carrier for detecting a first air interface transmission at a current moment and the mapping relation between the resource for detecting the first air interface transmission and the non-contention-based random access resource; and a sending module 12 is configured to send a second air interface transmission to a second communication node according to the non-contention-based random access resource after a receiving module 10 receives the first air interface transmission sent from the second communication node, and the non-contention-based random access resource includes at least one of an initial carrier number and an initial subcarrier number of the non-contention-based random access resource.

In an embodiment, the configuration information of the transmission resource includes the offset configuration information of the frequency domain resource information of the non-contention-based random access resource, the offset configuration information of the frequency domain resource information of the non-contention-based random access resource includes N carriers, and N is a positive integer; under a condition that $m_i$ subcarrier resources are configured on each carrier i, an initial frequency domain resource group of the non-contention-based random access resource includes M resources, and $M=\Sigma_{i=1}^{N} m_i$; a sending module 12 is configured to send a second air interface transmission to a second communication node according to an initial frequency domain resource of a non-contention-based random access resource after a receiving module 10 receives a first air interface transmission sent from the second communication node; and the initial frequency domain resource of the non-contention-based random access resource is obtained through at least one of the following manners: a first communication node determines an offset of the frequency domain resource information of the non-contention-based random access resource according to the offset configuration information of the frequency domain resource information of the non-contention-based random access resource; the first communication node obtains the initial frequency domain resource of the non-contention-based random access resource from the initial frequency domain resource group of the non-contention-based random access resource according to the offset of the frequency domain resource information of the non-contention-based random access resource; the first communication node conducts a modulo operation using a terminal identifier as a dividend and M as a divisor to determine the initial frequency domain resource of the non-contention-based random access resource; the first communication node conducts, under a condition that a carrier quantity of the first air interface transmission is larger than M, a modulo operation using a carrier number for detecting the first air interface transmission at a current moment as a dividend and M as a divisor to determine the initial frequency domain resource of the non-contention-based random access resource; and the first communication node conducts, under a condition that a carrier quantity of the first air interface transmission is smaller than M, a modulo operation using each resource number in the initial frequency domain resource group of the non-contention-based random access resource as a dividend and the carrier quantity for detecting the first air interface transmission as a divisor to determine the initial frequency domain resource of the non-contention-based random access resource.

In an embodiment, the configuration information of the transmission resource includes at least two sets of downlink transmission reception timer configuration information for different types of first communication nodes; each set of downlink transmission reception timer configuration information includes at least one of type information, a timer length and a timer initial position offset; the type information is used for indicating a stationary or non-stationary state of a first communication node, or indicate whether the first communication node is constantly in one cell or moves into the cell from other cells; and the timer initial position offset is set as an offset relative to a previous uplink transmission end position of the first communication node.

In an embodiment, the configuration information of the transmission resource includes the usage mode information of the random access resource; the usage mode information of the random access resource includes at least one of the following information:

each piece of usage mode information of the random access resource corresponds to a set of random access resource; the usage mode information of the random access resource is used for marking a coverage level of the random access resource; the usage mode information of the random access resource is used for marking a feature of an uplink transmission after a first communication node uses the random access resource to send a second air interface transmission; a processing module 11 is configured to select a set of random access resource after a receiving module 10 receives a first air interface transmission sent from a second communication node; and a sending module 12 is configured to send a second air interface transmission to the second communication node.

In an embodiment, a processing module 11 is configured to obtain an offset of a transmission resource within a range of the configuration information of the transmission resource; and an initial position X of the transmission resource is determined, and the offset of the transmission resource is superimposed on the initial position X to obtain a position, which is equal to X+offset, of an actually used transmission resource.

In an embodiment, a transmission resource includes at least one of the following resources: a random access resource, a contention-based random access resource, a non-contention-based random access resource, a grant-free resource, a grant-free uplink transmission resource, and a grant-free downlink transmission resource.

In an embodiment, an initial position X is determined according to at least one of a terminal identifier and a cell identifier.

In an embodiment, a receiving module 10 is configured to receive an offset of the transmission resource within configuration information of a transmission resource, which is sent from a second communication node in a broadcast message or a dedicated message; and a processing module 11 is configured to determine the offset of the transmission resource within the range of the configuration information of the transmission resource according to a terminal identifier or a cell identifier.

In an embodiment, a receiving module 10 is further configured to receive a third air interface transmission (message 2) sent from a second communication node; and a sending module 12 is further configured to send a fourth air interface transmission (message 3) to the second communication node, and the fourth air interface transmission includes an identifier of a first communication node.

In an embodiment, an identifier of a first communication node includes at least one of an NAS identifier and a resume ID.

In an embodiment, a first air interface transmission is an SI paging message; a second air interface transmission is at least one of a random access message and a random access preamble; a third air interface transmission is at least one of downlink data information, a random access response message and a random access preamble response; and a fourth air interface transmission is at least one of an uplink message and uplink data information.

In an embodiment, first information is at least one of a broadcast message, a dedicated message, a unicast message and a configuration signaling.

Figure 10:
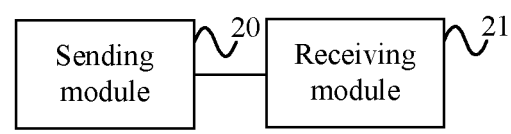
FIG. 10 is a structural schematic diagram of another data transmission apparatus provided in an embodiment.

FIG. 10 shows a structural schematic diagram of another data transmission apparatus provided in an embodiment. The data transmission apparatus may be configured in a second communication node. As shown in FIG. 10, the apparatus includes a sending module 20. In an embodiment, the apparatus further includes a receiving module 21.

A sending module 20 is configured to send first information to a first communication node, and the first information includes configuration information of a transmission resource.

The data transmission apparatus provided in the embodiment is configured to implement the data transmission method of an embodiment shown in FIG. 4, and an implementation principle of the data transmission apparatus provided in the embodiment is similar to that of the data transmission method, which is not described in details herein.

In an embodiment, the configuration information of the transmission resource includes at least one of the following information:

offset configuration information of a dedicated resource; frequency domain resource information of a non-contention-based random access resource; a mapping relation between a resource for detecting a first air interface transmission and a non-contention-based random access resource; offset configuration information of frequency domain resource information of a non-contention-based random access resource; offset configuration information of time domain resource information of a non-contention-based random access resource; at least two sets of downlink transmission reception timer configuration information for different types of first communication nodes; and usage mode information of a random access resource.

In an embodiment, the configuration information of the transmission resource includes offset configuration information of a dedicated resource; the offset configuration information of the dedicated resource includes at least one of a length and a range of an offset of the dedicated resource; and a receiving module 21 is configured to receive a second air interface transmission (message 1) sent from a first communication node according to the dedicated resource after a sending module 20 sends a first air interface transmission (message 0) to the first communication node.

In an embodiment, the configuration information of the transmission resource includes offset configuration information of a dedicated resource; and the offset configuration information of the dedicated resource includes at least two sets of offset configuration information of the dedicated resource for first communication nodes with different functions, and each set of offset configuration information of the dedicated resource includes at least one of a length and a range of an offset of the dedicated resource.

In an embodiment, a function using a dedicated resource is at least one of the following functions: handover, PDCCH order, EDT, MO-EDT and MT-EDT; and the function is one of contents of offset configuration information of the dedicated resource.

In an embodiment, a dedicated resource includes at least one of a non-contention-based random access resource, a dedicated random access resource and a dedicated terminal identifier.

In an embodiment, a non-contention-based random access resource or a dedicated random access resource includes at least one of the following parameters: a random access preamble in an eMTC system; a carrier number and a subcarrier number in a random access frequency domain resource in an NB-IoT system; a random access time domain resource; and a random access resource based on SSB in an NR system; and a dedicated terminal identifier includes at least one of the following parameters: C-RNTI designated by a terminal; and RNTI of another type.

In an embodiment, the configuration information of the transmission resource includes the frequency domain resource information of the non-contention-based random access resource, and the frequency domain resource information of the non-contention-based random access resource includes at least one of an initial carrier list and an initial subcarrier list; the initial carrier list includes N carriers, the initial subcarrier list includes T subcarriers, and N and T are positive integers; a receiving module 21 is configured to receive a second air interface transmission sent from a first communication node according to an initial carrier number of the non-contention-based random access resource after a sending module 20 sends a first air interface transmission to the first communication node; and/or, the receiving module 21 is configured to receive a second air interface transmission sent from the first communication node according to an initial subcarrier number of the non-contention-based random access resource after the sending module 20 sends the first air interface transmission to the first communication node.

In an embodiment, the configuration information of the transmission resource includes the mapping relation between the resource for detecting the first air interface transmission and the non-contention-based random access resource; and a receiving module 21 is configured to receive a second air interface transmission sent from a first communication node according to the non-contention-based random access resource after a sending module 20 sends a first air interface transmission to the first communication node, and the non-contention-based random access resource includes at least one of an initial carrier number and an initial subcarrier number of the non-contention-based random access resource.

In an embodiment, the configuration information of the transmission resource includes the offset configuration information of the frequency domain resource information of the non-contention-based random access resource, the offset configuration information of the frequency domain resource information of the non-contention-based random access resource includes N carriers, and N is a positive integer; under a condition that $m_i$ subcarrier resources are configured on each carrier i, an initial frequency domain resource group of the non-contention-based random access resource includes M resources, and $M=\Sigma_{i=1}^{N} m_i$; and a receiving module 21 is configured to receive a second air interface transmission sent from a first communication node according to an initial frequency domain resource of the non-contention-based random access resource after a sending module 20 sends a first air interface transmission to the first communication node.

In an embodiment, the configuration information of the transmission resource includes at least two sets of downlink transmission reception timer configuration information for different types of first communication nodes; each set of downlink transmission reception timer configuration information includes at least one of type information, a timer length and a timer initial position offset; the type information is used for indicating a stationary or non-stationary state of a first communication node, or indicate whether the first communication node is constantly in one cell or moves into the cell from other cells; and the timer initial position offset is set as an offset relative to a previous uplink transmission end position of the first communication node.

In an embodiment, the configuration information of the transmission resource includes the usage mode information of the random access resource; the usage mode information of the random access resource includes at least one of the following information:

each piece of usage mode information of the random access resource corresponds to a set of random access resource; the usage mode information of the random access resource is used for marking a coverage level of the random access resource; the usage mode information of the random access resource is used for marking a feature of an uplink transmission after a first communication node uses the random access resource to send a second air interface transmission; and a receiving module 21 is configured to receive a second air interface transmission sent from a first communication node according to a selected set of random access resource after a sending module 20 sends a first air interface transmission to the first communication node.

In an embodiment, a sending module 20 is further configured to send a third air interface transmission (message 2) to a first communication node; and a receiving module 21 is further configured to receive a fourth air interface transmission (message 3) sent from the first communication node, and the fourth air interface transmission includes an identifier of the first communication node.

In an embodiment, an identifier of a first communication node includes at least one of an NAS identifier and a resume ID.

In an embodiment, a first air interface transmission is an SI paging message; a second air interface transmission is at least one of a random access message and a random access preamble; a third air interface transmission is at least one of downlink data information, a random access response message and a random access preamble response; and a fourth air interface transmission is at least one of an uplink message and uplink data information.

In an embodiment, first information is at least one of a broadcast message, a dedicated message, a unicast message and a configuration signaling.

Figure 11:
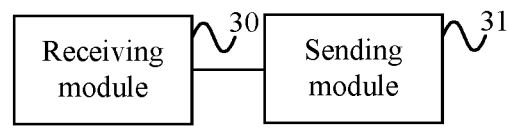
FIG. 11 is a structural schematic diagram of another data transmission apparatus provided in an embodiment.

FIG. 11 shows a structural schematic diagram of another data transmission apparatus provided in an embodiment. The data transmission apparatus may be configured in a first communication node. As shown in FIG. 11, the apparatus includes a receiving module 30 and a sending module 31.

The receiving module 30 is configured to receive a third air interface transmission (message 2) sent from a second communication node, and the third air interface transmission includes at least one of the following features: the third air interface transmission includes downlink data, and the third air interface transmission indicates that a first communication node sends large-flow uplink data to the second communication node. The sending module 31 is configured to send a fourth air interface transmission (message 3) to the second communication node according to the third air interface transmission, and the fourth air interface transmission triggers an RRC connection between the second communication node and the first communication node.

The data transmission apparatus provided in the embodiment is configured to implement the data transmission method of an embodiment shown in FIG. 5, and an implementation principle of the data transmission apparatus provided in the embodiment is similar to that of the data transmission method, which is not described in details herein.

In an embodiment, a fourth air interface transmission includes any one of an RRC connection establishment completion message, an RRC connection resume completion message, or an RRC connection reconfiguration completion message.

In an embodiment, a fourth air interface transmission further includes any one of an RRC connection establishment request message, an RRC connection resume request message, or an RRC connection reconfiguration request message.

In an embodiment, a receiving module 30 is further configured to receive a fifth air interface transmission (message 4) sent from a second communication node, and the fifth air interface transmission includes any one of an RRC connection establishment message, an RRC connection resume message, or an RRC connection reconfiguration message; and a sending module 31 is further configured to send a sixth air interface transmission to the second communication node according to the fifth air interface transmission, and the sixth air interface transmission includes any one of an RRC connection establishment completion message, an RRC connection resume completion message, or an RRC connection reconfiguration completion message.

In an embodiment, a fourth air interface transmission includes an identifier of a first communication node.

In an embodiment, an identifier of a first communication node includes at least one of an NAS identifier and a resume ID.

Figure 12:
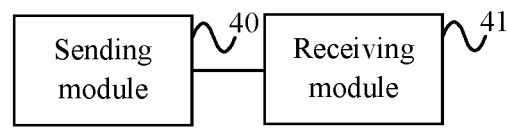
FIG. 12 is a structural schematic diagram of another data transmission apparatus provided in an embodiment.

FIG. 12 shows a structural schematic diagram of another data transmission apparatus provided in an embodiment. The data transmission apparatus may be configured in a second communication node. As shown in FIG. 12, the apparatus includes a sending module 40 and a receiving module 41.

The sending module 40 is configured to send a third air interface transmission (message 2) to a first communication node, and the third air interface transmission includes at least one of the following features: the third air interface transmission includes downlink data, and the third air interface transmission indicates the first communication node to send large-flow uplink data to the second communication node. The receiving module 41 is configured to receive a fourth air interface transmission (message 3) to sent from the first communication node, and the fourth air interface transmission triggers an RRC connection between the second communication node and the first communication node.

The data transmission apparatus provided in the embodiment is configured to implement the data transmission method of an embodiment shown in FIG. 6, and an implementation principle of the data transmission apparatus provided in the embodiment is similar to that of the data transmission method, which is not described in details herein.

In an embodiment, a fourth air interface transmission includes any one of an RRC connection establishment completion message, an RRC connection resume completion message, or an RRC connection reconfiguration completion message.

In an embodiment, a fourth air interface transmission further includes any one of an RRC connection establishment request message, an RRC connection resume request message, or an RRC connection reconfiguration request message.

In an embodiment, a sending module 40 is further configured to send a fifth air interface transmission (message 4) to a first communication node, and the fifth air interface transmission includes any one of an RRC connection establishment message, an RRC connection resume message, or an RRC connection reconfiguration message; and a receiving module 41 is further configured to receive a sixth air interface transmission sent from the first communication node, and the sixth air interface transmission includes any one of an RRC connection establishment completion message, an RRC connection resume completion message, or an RRC connection reconfiguration completion message.

In an embodiment, a fourth air interface transmission includes an identifier of a first communication node.

In an embodiment, an identifier of a first communication node includes at least one of an NAS identifier and a resume ID.

An embodiment of the present application further provides a data transmission apparatus, which includes: a processor, and the processor is configured to implement the method provided in any one of embodiments of the present application when executing a computer program. Specifically, a service transmission apparatus may be a first communication node provided in any embodiment of the present application or a second communication node provided in any embodiment of the present application, which is not specifically limited in the present application.

The following embodiments provide schematic structural diagrams of data transmission apparatuses as UE and a base station respectively.

Figure 13:
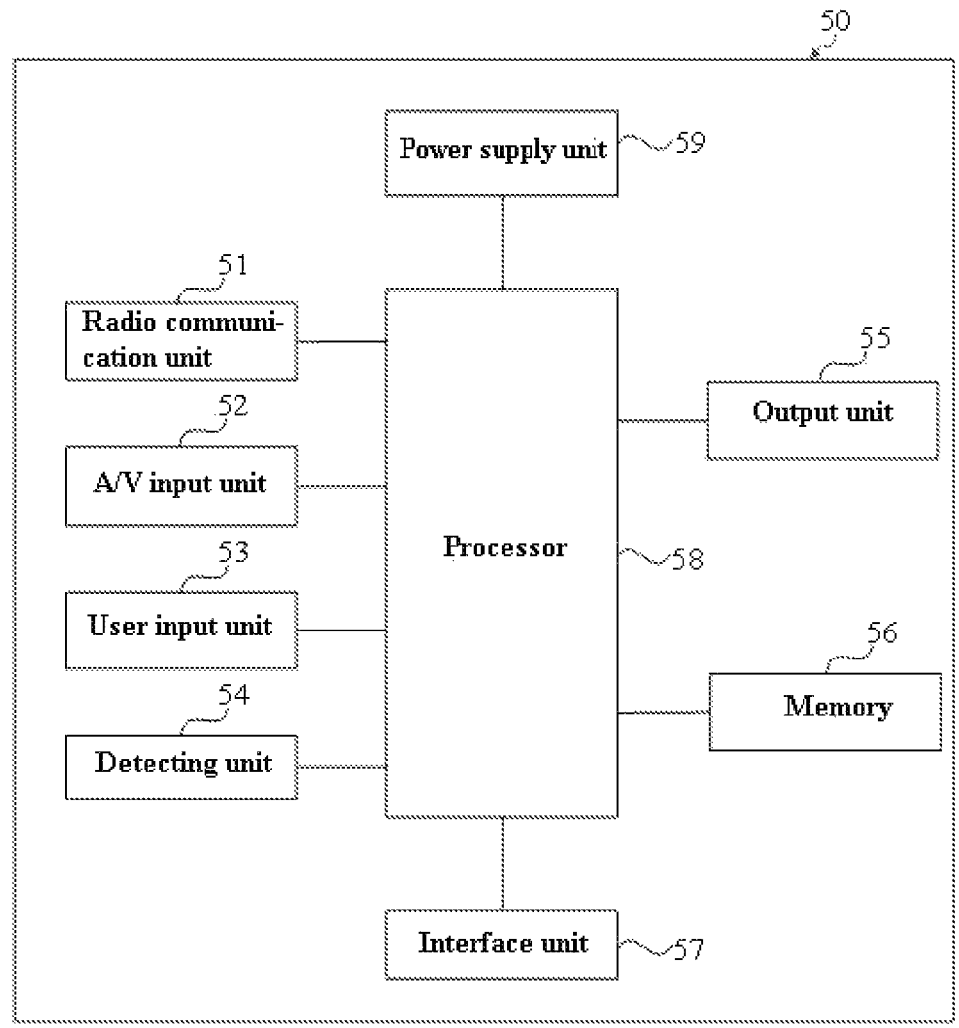
FIG. 13 is a structural schematic diagram of user equipment (UE) provided in an embodiment.

FIG. 13 shows a structural schematic diagram of UE provided in an embodiment. The UE may be implemented in various forms. The UE in the present application may include, but is not limited to, a mobile phone, a smart phone, a notebook computer, a digital broadcast receiver, a personal digital assistant (PDA), a portable device (PAD), a portable media player (PMP), a navigation device, vehicle-mounted terminal equipment, a vehicle-mounted display terminal, a vehicle-mounted electronic rearview mirror, or other mobile terminal equipment, and fixed terminal equipment such as digital television (TV) and a desktop computer.

As shown in FIG. 13, UE 50 may include a radio communication unit 51, an audio/video (A/V) input unit 52, a user input unit 53, a detecting unit 54, an output unit 55, a memory 56, an interface unit 57, a processor 58, a power supply unit 59, etc. FIG. 13 shows UE including various components, but it should be understood that not all the components shown are required to be implemented. More or fewer components may alternatively be implemented.

In the embodiment, the radio communication unit 51 allows radio communication between the UE 50 and a base station or a network. The A/V input unit 52 is configured to receive an audio or video signal. The user input unit 53 may generate key input data according to a command input by a user to control various operations of the UE 50. The detecting unit 54 detects a current state of the UE 50, a position of the UE 50, presence or absence of touch input to the UE 50 of the user, an orientation of the UE 50, acceleration or deceleration movement and direction of the UE 50, etc., and generates a command or signal for controlling an operation of the UE 50. The interface unit 57 serves as an interface through which at least one external apparatus can be connected to the UE 50. The output unit 55 is configured to provide an output signal in a visual, audio and/or tactile manner. The memory 56 may store software programs, etc. for processing and controlling operations executed by the processor 58, or may temporarily store data that has been output or will be output. The memory 56 may include at least one type of storage media. Furthermore, the UE 50 may cooperate with a network storage apparatus that executes a storage function of the memory 56 through a network connection. The processor 58 generally controls an overall operation of the UE 50. The power supply unit 59 receives external power or internal power under control of the processor 58 and provides appropriate power required to operate various elements and components.

The processor 58 executes at least one of functional applications and data processing by running a program stored in the memory 56, for example, thus implementing the method provided in an embodiment of the present application.

Figure 14:
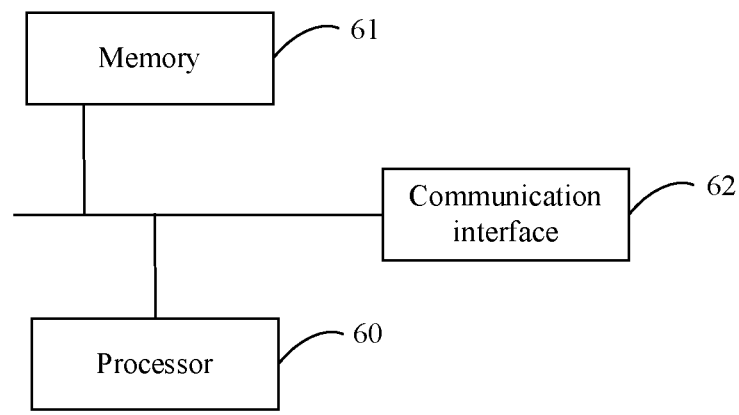
FIG. 14 is a structural schematic diagram of a base station provided in an embodiment.

FIG. 14 shows a structural schematic diagram of a base station provided in an embodiment. As shown in FIG. 14, the base station includes a processor 60, a memory 61 and a communication interface 62. The number of processors 60 in the base station may be one or more. FIG. 14 takes a processor 60 as an example. The processor 60, the memory 61 and the communication interface 62 in the base station may be connected by means of a bus or in other modes. FIG. 14 takes a bus connection as an example. A bus means one or more of several bus structures, including a memory bus or a memory controller, a peripheral bus, a graphics acceleration port, a processor or a local bus using any of several bus structures.

As a computer-readable storage medium, the memory 61 may be set as a storage software program, a computer executable program and a module, such as a program instruction/module corresponding to the method in the embodiments of the present application. The processor 60 executes at least one of functional applications of the base station and data processing by running a software program, an instruction and a module stored in the memory 61, thus implementing the above-mentioned data transmission method.

The memory 61 may include a program storage area and a data storage area, where the program storage area may store an operating system and an application program required for at least one function; and the data storage area may store data, etc. created according to usage of a terminal. Moreover, the memory 61 may include a high-speed random access memory, and may further include a non-volatile memory, for example, at least one magnetic disk memory device, a flash memory device, or other non-volatile solid-state memory devices. In some examples, the memory 61 may include a memory remotely arranged with respect to the processor 60, and the remote memory may be connected to the base station by means of a network. Examples of networks described above include, but not limited to, the Internet, enterprise intranets, local area networks, mobile communication networks, and combinations thereof.

The communication interface 62 may be configured for data receiving and sending.

An embodiment of the present application further provides a computer-readable storage medium, which stores a computer program, where the computer program implements the method of any one of the above-mentioned embodiments of the present application when being executed by the processor.

A computer storage medium of the embodiment of the present application may be any combination of one or more computer-readable media. The computer-readable medium may be a computer-readable signal medium or a computer-readable storage medium. For example, the computer-readable storage medium may be, but not limited to, electronic, magnetic, optical, electromagnetic, infrared,
- or a semiconductor system, apparatus or device, or a combination of any of the above. The computer-readable storage medium includes (a non-exhaustive list): an electrical connection with one or more wires, a portable computer disk, a hard disk,
- a random access memory (RAM), a read-only memory (ROM), an erasable programmable read-only memory (EPROM), a flash memory, an optical fiber, a compact disc read-only memory (CD-ROM), an optical storage device, a magnetic storage device, or any suitable combination of the above. In the present application, the computer-readable storage medium may be any tangible medium that includes or stores a program, and the program may be used by or in combination with an instruction execution system, apparatus or device.

The computer-readable signal medium may include a data signal in a baseband or as part of a carrier for transmission, and the data signal carries a computer-readable program code. The transmitted data signal may take many forms, including but not limited to electromagnetic signals, optical signals or any suitable combination of the above. The computer-readable signal medium may further be any computer-readable medium other than the computer-readable storage medium, and the computer-readable medium may send, propagate or transmit a program for usage by or in combination with an instruction execution system, apparatus or device.

The program code included in the computer-readable medium may be transmitted by any suitable medium, including but not limited to wireless, electric wire, optical cable, radio frequency (RF), etc., or any suitable combination of the above.

The computer program code for executing an operation of the present application may be written in one or more programming languages or a combination of a plurality of programming languages. The programming languages include object-oriented programming languages such as Java, Smalltalk. C++, Ruby and Go, and conventional procedural programming languages such as "C" or similar programming languages. The program code may be executed entirely on a user computer, executed partially on the user computer, executed as a stand-alone software package, executed partially on the user computer and partially on a remote computer, or executed entirely on the remote computer or a server. Where the remote computer is involved, the remote computer may be connected to the user computer through any type of network, including the local area network (LAN) or the wide area network (WAN), or may be connected to an external computer (for example, the remote computer is connected through the Internet by an Internet service provider).

Those skilled in the art should understand that the term user terminal covers any suitable type of wireless user equipment, such as mobile phones, portable data processing apparatuses, portable web browsers or vehicle-mounted mobile stations.

Generally speaking, various embodiments of the present application may be implemented in hardware or dedicated circuits, software, logic or any combination thereof. For example, some aspects may be implemented in hardware, while other aspects may be implemented in firmware or software that may be executed by a controller, a microprocessor or other computing apparatuses, although the present application is not limited thereto.

Embodiments of the present application may be implemented by executing a computer program instruction by a data processor of a mobile device, for example, in a processor entity, or by hardware, or by a combination of software and hardware. The computer program instructions may be assembly instructions, instruction set architecture (ISA) instructions, machine instructions, machine-related instructions, a microcode, firmware instructions, state setting data, or source codes or object codes written in any combination of one or more programming languages.

A block diagram of any logical procedure in the drawings of the present application may represent program operations, or may represent interconnected logic circuits, modules and functions, or may represent a combination of program operations and logic circuits, modules and functions. A computer program may be stored in the memory. The memory may be of any type suitable for the local technical environment and may be implemented by using any suitable data storage technology, such as but not limited to ROM, RAM, optical memory devices and systems (digital versatile discs (DVD) or compact disks (CD)). The computer-readable medium may include a non-transitory storage medium. The data processor may be any type suitable for the local technical environment, such as, but not limited to, a general purpose computer, a special purpose computer, a microprocessor, digital signal processing (DSP), an application specific integrated circuit (ASIC), a field-programmable gate array (FGPA) and processors based on a multi-core processor structure.

What is claimed is:

1. A data transmission method, comprising:
receiving, by a first communication node, first information sent from a second communication node, wherein the first information comprises configuration information of a transmission resource;
wherein the configuration information of the transmission resource comprises offset configuration information of frequency domain resource information of a non-contention-based random access resource, the offset configuration information of the frequency domain resource information of the non-contention-based random access resource comprises N carriers, and N is a positive integer; under a condition that $m_i$ subcarrier resources are configured on each carrier i in the N carriers, an initial frequency domain resource group of the non-contention-based random access resource comprises M resources, and $M=\Sigma_{i=1}^{N} m_i$; the method further comprises:

sending, by the first communication node, a second air interface transmission to the second communication node according to an initial frequency domain resource of the non-contention-based random access resource after receiving a first air interface transmission sent from the second communication node; and the initial frequency domain resource of the non-contention-based random access resource is obtained through at least one of following manners:

determining, by the first communication node, an offset of the frequency domain resource information of the non-contention-based random access resource according to the offset configuration information of the frequency domain resource information of the non-contention-based random access resource; obtaining, by the first communication node, the initial frequency domain resource of the non-contention-based random access resource from the initial frequency domain resource group of the non-contention-based random access resource according to the offset of the frequency domain resource information of the non-contention-based random access resource;

conducting, by the first communication node, a modulo operation using a terminal identifier as a dividend and M as a divisor to determine the initial frequency domain resource of the non-contention-based random access resource;

conducting, by the first communication node under a condition that a carrier quantity of the first air interface transmission is larger than M, a modulo operation using a carrier number for detecting the first air interface transmission at a current moment as a dividend and M as a divisor to determine the initial frequency domain resource of the non-contention-based random access resource; and conducting, by the first communication node under a condition that a carrier quantity of the first air interface transmission is smaller than M, a modulo operation using each resource number in the initial frequency domain resource group of the non-contention-based random access resource as a dividend and the carrier quantity for detecting the first air interface transmission as a divisor to determine the initial frequency domain resource of the non-contention-based random access resource.

2. The method according to claim 1, wherein the configuration information of the transmission resource further comprises at least one of following information:

offset configuration information of a dedicated resource;

frequency domain resource information of a non-contention-based random access resource;

a mapping relation between a resource for detecting a first air interface transmission and a non-contention-based random access resource;

offset configuration information of time domain resource information of a non-contention-based random access resource;

at least two sets of downlink transmission reception timer configuration information for different types of first communication nodes; and usage mode information of a random access resource.

3. The method according to claim 2, wherein the configuration information of the transmission resource comprises the offset configuration information of the dedicated resource; the offset configuration information of the dedicated resource comprises a target parameter, and the target parameter comprises at least one of following parameters: a length of an offset of the dedicated resource and a range of the offset of the dedicated resource; and the method further comprises:

determining, by the first communication node, an effective value of the offset of the dedicated resource according to the target parameter;

determining, by the first communication node, the dedicated resource according to the effective value of the offset of the dedicated resource; and sending, by the first communication node, a second air interface transmission (message 1) to the second communication node according to the dedicated resource after receiving a first air interface transmission (message 0) sent from the second communication node.

4. The method according to claim 2, wherein the configuration information of the transmission resource comprises the offset configuration information of the dedicated resource; the offset configuration information of the dedicated resource comprises at least two sets of offset configuration information of the dedicated resource for first communication nodes with different functions, and each set of offset configuration information of the dedicated resource comprises at least one of following parameters: a length of an offset of the dedicated resource and a range of the offset of the dedicated resource.

5. The method according to claim 4, wherein a function using the dedicated resource is at least one of following functions: handover, physical layer downlink control channel order (PDCCH order), early data transmission (EDT), mobile originated early data transmission (MO-EDT) and mobile terminated early data transmission (MT-EDT); and the function is one of contents of the offset configuration information of the dedicated resource.

6. The method according to claim 2, wherein the dedicated resource comprises at least one of a non-contention-based random access resource, a dedicated random access resource and a dedicated terminal identifier.

7. The method according to claim 6, wherein the non-contention-based random access resource or the dedicated random access resource comprises at least one of following parameters: a random access preamble in an enhanced machine-type communication (eMTC) system; a carrier number in a random access frequency domain resource in a narrowband Internet of Things (NB-IoT) system and a subcarrier number in the random access frequency domain resource in the NB-IoT system; a random access time domain resource; and a random access resource based on a single side band (SSB) in a new radio (NR) system; and the dedicated terminal identifier comprises at least one of following parameters: a cell-radio network temporary identifier (C-RNTI) designated by a terminal; and a radio network temporary identifier (RNTI) of another type.

8. The method according to claim 2, wherein the configuration information of the transmission resource comprises the frequency domain resource information of the non-contention-based random access resource, and the frequency domain resource information of the non-contention-based random access resource comprises at least one of an initial carrier list and an initial subcarrier list; the initial carrier list comprises N carriers, the initial subcarrier list comprises T subcarriers, and N and T are positive integers; and the method further comprises at least one of following operations:

conducting, by the first communication node, a modulo operation using a carrier number for detecting a first air interface transmission at a current moment as a dividend and N as a divisor to determine an initial carrier number of the non-contention-based random access resource; sending, by the first communication node, a second air interface transmission to the second communication node according to the initial carrier number of the non-contention-based random access resource after receiving the first air interface transmission sent from the second communication node;

conducting, by the first communication node, a modulo operation using a subcarrier number for detecting a first air interface transmission at a current moment as a dividend and T as a divisor to determine an initial subcarrier number of the non-contention-based random access resource; and sending, by the first communication node, a second air interface transmission to the second communication node according to the initial subcarrier number of the non-contention-based random access resource after receiving the first air interface transmission sent from the second communication node.

9. The method according to claim 2, wherein the configuration information of the transmission resource comprises the mapping relation between the resource for detecting the first air interface transmission and the non-contention-based random access resource; and the method further comprises:

determining, by the first communication node, a non-contention-based random access resource according to a carrier for detecting a first air interface transmission at a current moment and the mapping relation between the resource for detecting the first air interface transmission and the non-contention-based random access resource; and sending, by the first communication node, a second air interface transmission to the second communication node according to the non-contention-based random access resource after receiving the first air interface transmission sent from the second communication node, wherein the non-contention-based random access resource comprises at least one of an initial carrier number and an initial subcarrier number of the non-contention-based random access resource.

10. The method according to claim 2, wherein the configuration information of the transmission resource comprises the at least two sets of downlink transmission reception timer configuration information for different types of first communication nodes; each set of downlink transmission reception timer configuration information comprises at least one of type information, a timer length and a timer initial position offset;

the type information is used for indicating a stationary or non-stationary state of the first communication node, or indicating whether the first communication node is constantly in one cell or moves into the cell from other cells; and the timer initial position offset is set as an offset relative to a previous uplink transmission end position of the first communication node.

11. The method according to claim 2, wherein the configuration information of the transmission resource comprises the usage mode information of the random access resource; the usage mode information of the random access resource comprises at least one of following information:

each piece of usage mode information of the random access resource corresponds to a set of random access resource;

the usage mode information of the random access resource is used for marking a coverage level of the random access resource; and the usage mode information of the random access resource is used for marking a feature of an uplink transmission after the first communication node uses the random access resource to send a second air interface transmission; and the method further comprises:

selecting, by the first communication node, a set of random access resource to send a second air interface transmission to the second communication node after receiving a first air interface transmission sent from the second communication node.

12. The method according to claim 1, further comprising:

obtaining, by the first communication node, an offset of a transmission resource within a range of the configuration information of the transmission resource; and determining, by the first communication node, an initial position X of the transmission resource, and superimposing the offset of the transmission resource on the initial position X to obtain a position, which is equal to X+offset, of an actually used transmission resource.

13. The method according to claim 12, wherein the transmission resource comprises at least one of following resources: a random access resource, a contention-based random access resource, a non-contention-based random access resource, a grant-free resource, a grant-free uplink transmission resource, and a grant-free downlink transmission resource;

or, the initial position X is determined according to at least one of a terminal identifier and a cell identifier;

or, obtaining, by the first communication node, the offset of the transmission resource is implemented in at least one of following manners: receiving, by the first communication node, the offset of the transmission resource within the range of the configuration information of the transmission resource, which is sent from the second communication node in a broadcast message or a dedicated message; and determining, by the first communication node, the offset of the transmission resource within the range of the configuration information of the transmission resource according to a terminal identifier and a cell identifier.

14. The method according to claim 1, wherein the first information is at least one of a broadcast message, a dedicated message, a unicast message and a configuration signaling.

15. The method according to claim 1, further comprising:

receiving, by the first communication node, a third air interface transmission (message 2) sent from the second communication node, wherein the third air interface transmission comprises at least one of following features: the third air interface transmission comprises downlink data, and the third air interface transmission indicates the first communication node to send large-flow uplink data to the second communication node; and sending, by the first communication node, a fourth air interface transmission (message 3) to the second communication node according to the third air interface transmission, wherein the fourth air interface transmission triggers a radio resource control (RRC) connection between the second communication node and the first communication node.

16. The method according to claim 15, wherein the fourth air interface transmission comprises any one of an RRC connection establishment completion message, an RRC connection resume completion message, or an RRC connection reconfiguration completion message;
or,
the fourth air interface transmission comprises any one of an RRC connection establishment request message, an RRC connection resume request message, or an RRC connection reconfiguration request message;
or,
the fourth air interface transmission comprises an identifier of the first communication node.

17. The method according to claim 16, in a case where the fourth air interface transmission comprises any one of an RRC connection establishment request message, an RRC connection resume request message, or an RRC connection reconfiguration request message, the method further comprising:
receiving, by the first communication node, a fifth air interface transmission (message 4) sent from the second communication node, wherein the fifth air interface transmission comprises any one of an RRC connection establishment message, an RRC connection resume message, or an RRC connection reconfiguration message; and
sending, by the first communication node, a sixth air interface transmission to the second communication node according to the fifth air interface transmission, wherein the sixth air interface transmission comprises any one of an RRC connection establishment completion message, an RRC connection resume completion message, or an RRC connection reconfiguration completion message.

18. The method according to claim 16, wherein in a case where the fourth air interface transmission comprises an identifier of the first communication node, the identifier of the first communication node comprises at least one of a non-access stratum (NAS) identifier and a resume identifier (ID).

19. A data transmission apparatus, provided in a first communication node and comprising: a processor, wherein the processor, when executing a computer program, is configured to:
receive first information sent from a second communication node, wherein the first information comprises configuration information of a transmission resource;
wherein the configuration information of the transmission resource comprises offset configuration information of frequency domain resource information of a non-contention-based random access resource, the offset configuration information of the frequency domain resource information of the non-contention-based random access resource comprises N carriers, and N is a positive integer; under a condition that $m_i$ subcarrier resources are configured on each carrier i in the N carriers, an initial frequency domain resource group of the non-contention-based random access resource comprises M resources, and $M=\Sigma_{i=1}^{N} m_i$; the processor is further configured to:
send a second air interface transmission to the second communication node according to an initial frequency domain resource of the non-contention-based random access resource after receiving a first air interface transmission sent from the second communication node; and
obtain the initial frequency domain resource of the non-contention-based random access resource through at least one of following manners:
determine an offset of the frequency domain resource information of the non-contention-based random access resource according to the offset configuration information of the frequency domain resource information of the non-contention-based random access resource; obtain the initial frequency domain resource of the non-contention-based random access resource from the initial frequency domain resource group of the non-contention-based random access resource according to the offset of the frequency domain resource information of the non-contention-based random access resource;
conduct a modulo operation using a terminal identifier as a dividend and M as a divisor to determine the initial frequency domain resource of the non-contention-based random access resource;
conduct under a condition that a carrier quantity of the first air interface transmission is larger than M, a modulo operation using a carrier number for detecting the first air interface transmission at a current moment as a dividend and M as a divisor to determine the initial frequency domain resource of the non-contention-based random access resource; and
conduct under a condition that a carrier quantity of the first air interface transmission is smaller than M, a modulo operation using each resource number in the initial frequency domain resource group of the non-contention-based random access resource as a dividend and the carrier quantity for detecting the first air interface transmission as a divisor to determine the initial frequency domain resource of the non-contention-based random access resource.

* * * * *